US009955355B2

(12) United States Patent
Sun

(10) Patent No.: US 9,955,355 B2
(45) Date of Patent: Apr. 24, 2018

(54) APPARATUS AND METHOD FOR WIRELESS COMMUNICATION SYSTEM

(71) Applicant: Sony Corporation, Tokyo (JP)

(72) Inventor: Chen Sun, Beijing (CN)

(73) Assignee: Sony Corporation, Tokyo (JP)

(*) Notice: Subject to any disclaimer, the term of this patent is extended or adjusted under 35 U.S.C. 154(b) by 78 days.

(21) Appl. No.: 14/651,072

(22) PCT Filed: Dec. 26, 2013

(86) PCT No.: PCT/CN2013/090509
§ 371 (c)(1),
(2) Date: Jun. 10, 2015

(87) PCT Pub. No.: WO2014/114163
PCT Pub. Date: Jul. 31, 2014

(65) Prior Publication Data
US 2015/0319622 A1 Nov. 5, 2015

(30) Foreign Application Priority Data
Jan. 28, 2013 (CN) .......................... 2013 1 0031299

(51) Int. Cl.
H04W 16/14 (2009.01)
H04W 72/08 (2009.01)

(52) U.S. Cl.
CPC ......... H04W 16/14 (2013.01); H04W 72/082 (2013.01)

(58) Field of Classification Search
CPC ... H04W 16/14; H04W 72/082; H04W 72/04; H04W 72/0486; H04W 72/085;
(Continued)

(56) References Cited

U.S. PATENT DOCUMENTS

2009/0161617 A1* 6/2009 Abedi ................... H04W 16/10
370/329
2010/0056215 A1* 3/2010 Gorokhov .............. H04B 7/024
455/561

(Continued)

FOREIGN PATENT DOCUMENTS

CN 101909303 A 12/2010
CN 102065544 A 5/2011

(Continued)

OTHER PUBLICATIONS

International Search Report dated Apr. 3, 2014 in PCT/CN13/090509 Filed Dec. 26, 2013.

Primary Examiner — Erica Navar
(74) Attorney, Agent, or Firm — Oblon, McClelland, Maier & Neustadt, L.L.P.

(57) ABSTRACT

A system that identifies a number of secondary systems located in a first geographical area; identifies a primary resource available to be assigned to the secondary systems, the primary resource being a resource to which a primary system has a priority usage right; determines whether the number of secondary systems located in the first geographical area exceeds a predetermined threshold value; and limits a number of secondary systems to which the primary resource is assigned when it is determined that the number of secondary systems located in the first geographical area exceeds the predetermined threshold value.

18 Claims, 13 Drawing Sheets

(58) Field of Classification Search
CPC ..... H04W 72/08; H04W 72/00; H04W 72/10; H04W 24/02; H04W 48/16; H04W 88/06; H04W 88/08; H04W 92/20
See application file for complete search history.

(56) References Cited

U.S. PATENT DOCUMENTS

| | | |
|---|---|---|
| 2010/0062785 A1 | 3/2010 | Hwang |
| 2011/0201372 A1 | 8/2011 | Luo et al. |
| 2012/0231829 A1 | 9/2012 | Guo |
| 2013/0039325 A1 | 2/2013 | Guo |
| 2013/0225159 A1 | 8/2013 | Hulkkonen et al. |
| 2013/0258979 A1 | 10/2013 | Hulkkonen et al. |
| 2013/0272162 A1* | 10/2013 | Li .................. H04W 24/06 370/254 |
| 2014/0051472 A1 | 2/2014 | Guo |

FOREIGN PATENT DOCUMENTS

| | | |
|---|---|---|
| CN | 102238549 A | 11/2011 |
| CN | 102752758 A | 10/2012 |
| WO | 2010/043270 A1 | 4/2010 |
| WO | 2012/062364 A1 | 5/2012 |

* cited by examiner

APPARATUS AND METHOD FOR WIRELESS COMMUNICATION SYSTEM

FIELD OF THE INVENTION

The disclosure relates to the field of wireless communication, and particularly to a method and apparatus in a wireless communication system in which a primary system and secondary systems coexist.

BACKGROUND OF THE INVENTION

With the evolution of wireless communications systems, users have increasing demands for high-quality, high-speed and new services. Wireless communication operators and apparatus manufacturers are required to continuously improve the systems to meet user's requirements. This requires a lot of transmission resources (the transmission resources may be frequency spectrum resources such as carriers, sub-carriers, or time-frequency resources such as time slots, and may be quantified with parameters such as time, frequency, bandwidth and/or maximum allowable transmission power and the like) to support new services and meet the needs of high-speed communications. Usually, limited transmission resources have been allocated to the fixed operators and services. New available transmission resources (e.g., frequency spectrums) are very rare or very expensive. In this case, the concept of dynamic spectrum utilization, which refers to dynamically utilizing the frequency spectrum resources which have been allocated to some services but are not fully utilized, is proposed. Such application scenarios typically include a primary system (PS) and a secondary system (SS). The primary system described herein may refer to those systems that have the frequency spectrum usage right, such as a television broadcasting system or a mobile communication system which is allocated with frequency spectrum resources; while the secondary system is a system which does not have the frequency spectrum usage right and can use appropriately frequency spectrums owned by the primary system merely when the primary system does not uses the frequency spectrums. In addition, both the primary system and the secondary system described herein can both be systems having the frequency spectrum usage right, but have different priority levels on the usage of the frequency spectrums. For example, when operators deploy new base stations to provide new services, the exiting base station and the provided services have the frequency spectrum usage priority. A base station of the primary system is called a primary base station (PBS), a user of the primary system is called a primary user (PU). A base station of the secondary system is called a secondary base station (SBS). A user of the secondary system is called a secondary user (SU). For example, when the primary system is a digital television broadcasting system, the secondary system can dynamically utilize the frequency spectrum of a channel in the digital television broadcast frequency spectrum on which no program is played or the frequency spectrum of an adjacent channel to perform a wireless mobile communication without interfering with the reception of television signals.

SUMMARY OF THE INVENTION

Some embodiments of the disclosure provide an apparatus and a method in a wireless communication system, which can effectively allocate transmission resources for secondary systems in a wireless communication application scenario wherein a primary system and secondary systems coexist.

A brief overview on the disclosure is given below so as to provide a basic understanding regarding some aspects of the disclosure. It should be understood that this overview is not an exhaustive overview of the disclosure. It is not intended to determine key or critical parts of the disclosure and is also not intended to limit the scope of the disclosure. Its purpose is to give some concepts in a simplified form to serve as a preamble of the more detailed description that is discussed later.

According to an aspect of the disclosure, there is provided a system that receives a request for resources from a first system of a plurality of systems having different levels of priority; identifies resources that are available in a second system different from the plurality of systems based on the received request; and determines whether to adjust a resource assigned to the plurality of systems based on the priority level of the first system and the resources that are available in the second system.

BRIEF DESCRIPTION OF THE DRAWINGS

The above and other objects, features and advantages of the disclosure will be more readily understood with reference to illustrations to the embodiments of the disclosure in conjunction with drawings. Components in the drawings are not drawn to scale, but merely to illustrate the principles of the disclosure. In the drawings, the same or similar technical features or components are denoted as the same or similar reference numerals.

DETAILED DESCRIPTION OF THE INVENTION

Figure 1:
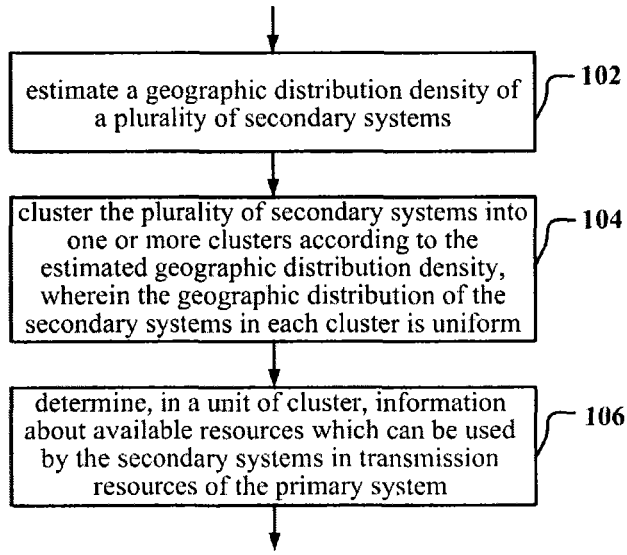
FIG. 1 is a schematic flow chart of a wireless transmission resource management method according to an embodiment of the disclosure.

The embodiments of the disclosure are illustrated below with reference to the drawings. Elements and features described in one drawing or one embodiment of the disclosure can be combined with elements and features showing in one or more other drawings or embodiments. It should be noted that, for purpose of clarity, representations and descriptions for components and processes that have no relation with the disclosure or have been known by those skilled in the art are omitted in the drawings and the specification.

Some embodiments of the disclosure provide an apparatus and a method for configuring wireless transmission resources of a primary system for a secondary system in a wireless communication scenario in which a primary system and a secondary system coexist. In the wireless communication scenario, a plurality of secondary systems can be included. The plurality of secondary systems shares the wireless transmission resources of the primary system.

The wireless transmission resources mentioned herein may be any time-frequency resources for information transmission in a communication system, such as carriers, sub-carriers or time slots. For example, in an orthogonal frequency division multiple access (OFDMA) system, the transmission resources may be sub-carriers. As another example, in a time division multiple access (TDMA) system, the transmission resources may be time slots. Further, the communication system mentioned in the disclosure is not limited to the above mentioned OFDMA or TDMA system, and it may be other types of communication systems, which will not be enumerated here. Here both allocating transmission resources for the secondary systems and performing transmission power control for the secondary systems can be considered as configuring wireless transmission resources for the secondary systems.

In addition, the primary system described herein may be any wireless communication system allocated with wireless transmission resources, such as a television broadcasting system or an existing wireless communication system of wireless operators, which will not be enumerated here.

FIG. 1 is a schematic flow chart of a wireless transmission resource management method according to an embodiment of the disclosure. The wireless transmission resource management method shown in FIG. 1 can be implemented by a wireless transmission resource management apparatus in a secondary system, and the wireless transmission resource management apparatus may be for example a frequency spectrum manner which manages transmission resources (e.g., frequency spectrums) of respective secondary systems. The frequency spectrum manager may be provided at a network server, or provided at an access point which is responsible for managing other access points.

As shown in FIG. 1, the wireless transmission resource management method includes steps 102, 104 and 106.

Specifically, in step 102, a geographic distribution density of the plurality of secondary systems is estimated. Specifically, the geographic distribution density of secondary systems in an activated state is estimated.

As an example, the location information of respective secondary systems can be collected, then the distribution densities of respective secondary systems in different time periods can be calculated according to the specified region, the secondary system service model or the like. For example, assuming that there are a certain number of residents in a certain geographical region, and assuming that each resident has one secondary system (such as a home wireless network or a home wireless game machine). The frequency spectrum manager can obtain information about locations and service models of secondary systems in respective regions from operators of the secondary systems, and store theses information (e.g., storing these information into a storage unit in the frequency spectrum manager (not shown in figure)), and estimate the distribution density of the secondary systems in an activated state in accordance with different time periods. For example, if a certain region belongs to a residential area, then during the day, because most of the residents walk out, the number of secondary systems in an activated state will be relatively less and the geographical distribution density thereof will be lower. While in the evening, most residents return home, the number of the secondary systems in an activated state will increase and the geographical distribution density thereof will be high. Thus, the distribution densities of the secondary systems in respective regions in different time periods can be calculated by the wireless transmission resource management apparatus according to the location information of the respective secondary systems and service models of the secondary systems.

The wireless transmission resource management apparatus can provide the density distribution of the secondary systems in different regions.

As a specific example, assuming that there is a certain number of residents in a certain geographical region, and assuming that each resident has one secondary system (such as a home wireless network or a home wireless game machine). Each user turning on/off his corresponding secondary system is random. That is, within a certain time period, some users use the wireless network (their corresponding secondary systems are in an activated state), while some users do not use the wireless network (their corresponding secondary systems are in an inactivated state). It can be assumed that the secondary systems in an activated state are distributed randomly in this region. If the distribution of the residents in this region is uniform, then it can be assumed that the geographic distribution of the secondary systems in an activated state in this region is uniform. Thus, the distribution density λ of the secondary systems in this region within a certain time period can be calculated by the following formula:

$$\lambda = \frac{\text{number of activated secondary systems}}{\text{area of region where secondary systems are located}}. \quad (1)$$

The number of activated secondary systems can be calculated according to the distribution of user services. For example, it can be assumed that the distribution of the user services is a Poisson distribution of an average value.

$$p(x = K) = \frac{e^{-\lambda_0} \lambda^K}{K!}. \quad (1A)$$

That is, the probability that there are K activated secondary users at a certain moment of each day is P (x=K). Assuming that there are $\lambda_0$ activated secondary users on average at this moment in these days. Therefore, we can use $\lambda_0$ and the formula (1) to calculate the distribution density of the secondary systems in a certain region at any moment. Other types of distribution, such as the Gaussian distribution, can also be used in the same way. Alternatively, the wireless transmission resource management apparatus can count the number of activated secondary systems according to signals sent from the activated secondary systems.

The above gives an example of estimating the geographical distribution density of the secondary systems. It should be understood that the above example is illustrative and not restrictive. Any other appropriate algorithm can also be used to estimate the geographic distribution density of the secondary systems, which is not defined here.

Then, in step 104, the plurality of secondary systems is clustered into one or more clusters according to the estimated geographic distribution density such that the geographic distribution of respective secondary systems in each cluster is uniform.

Each secondary system cluster can be described using parameters such as a center, an area, a region, a radius and/or an angle range of the cluster, which is not defined here.

Any appropriate method can be used to perform clustering, as long as the geographic distribution of secondary systems in respective secondary system cluster is uniform.

After the respective secondary systems are clustered, in step 106, the information about available resources which can be used by the secondary systems in transmission resources of the primary system can be determined in a unit of cluster. That is to say, the available transmission resources are configured for the respective secondary systems in a unit of cluster in which the distribution of the secondary systems is uniform.

In the embodiment shown in FIG. 1, the geographic distribution of the secondary systems in each secondary system cluster is made to be uniform, thus the calculation for the interference of the secondary systems to the primary system can be simplified. Also it is possible to make the respective secondary systems in a cluster use the maximum transmission power at different geographic locations, so as to simplify the system frequency spectrum management. Then, when the configuration and management for the transmission resources of the secondary systems are made in a unit of cluster, the utilization of the transmission resources can be further optimized.

As a preferred embodiment, channel modes between respective secondary systems can also be obtained (this step is not shown in figure, and this step can be performed before the clustering step 104). Thus, the secondary systems can be clustered according to the channel models between the respective secondary systems and the geographic distribution density of the respective secondary systems, such that not only the geographic distribution of the respective secondary systems in each cluster is uniform, but also the channel models between the respective secondary systems in each cluster are substantially consistent with each other. The channel models between the respective secondary systems can be estimated according to information about the terrain and the building distribution and structures in the geographic region where the secondary systems are located. The wireless transmission resource management apparatus can obtain such information from for example the operators of the secondary systems in advance and then estimate the channel models. Alternatively, the wireless transmission resource management apparatus can obtain the information about the channel models between the respective secondary systems from the operators of the secondary systems and store the information into its storage unit. Using such method, when the configuration and management for transmission resources of the secondary systems is made in a unit of cluster, the utilization of the transmission resources can be further optimized.

As another preferred embodiment, channel models between respective secondary systems and the primary system can also be obtained (this step is not shown in figure, and this step can be performed before the clustering step 104). Thus, the secondary systems can be clustered according to the channel models between respective secondary systems and the primary system and the geographic distribution density of the respective secondary systems, such that not only the geographic distribution of the respective secondary systems in each cluster is uniform, but also the channel models between the respective secondary systems in each cluster and the primary system are substantially consistent with each other. The channel model between the secondary system and the primary system refers to a channel model between the secondary system and the coverage region of the primary system, which can be estimated according to the terrain and the building distribution and structures from the secondary system to the coverage region of the primary system. For example, the wireless transmission resource management apparatus can obtain such information from the operators of the secondary systems and the primary system in advance and then estimate the channel models. The wireless transmission resource management apparatus can obtain information about the channel models between the respective secondary systems and the primary system from the operators of the secondary systems, and store the information into its storage unit. Using such method, when the configuration and management for transmission resources of the secondary systems are made in a unit of cluster, the utilization of the transmission resources can be further optimized.

Figure 7:
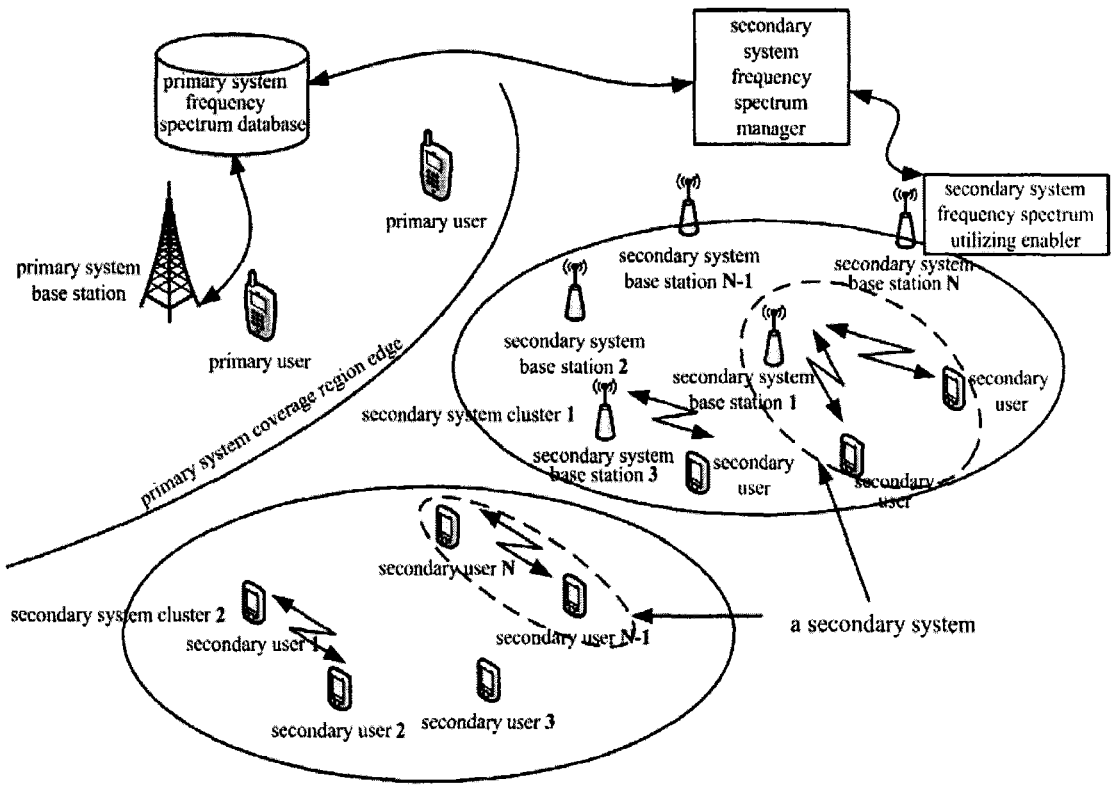
FIG. 7 is a schematic diagram of a radio system scenario including a primary system and a plurality of secondary systems in which an embodiment of the disclosure can be applied.

FIG. 7 is a schematic diagram of an application scenario including a primary system and a plurality of secondary systems in which the embodiment of the invention can be applied. As shown in FIG. 7, a frequency spectrum manager can be provided for the secondary systems. In addition, a frequency spectrum utilizing enabler can be provided. In FIG. 7, the frequency spectrum utilizing enabler is shown as an independent device which interacts with the frequency spectrum manager and the secondary systems. As described above, the frequency spectrum utilizing enabler can be provided in an AP or a base station of the secondary system as a part of the AP or the base station, or provided in the frequency spectrum manager as a part of the frequency spectrum manager. As shown in FIG. 7, the plurality of secondary systems can be clustered into multiple secondary system clusters.

Each secondary system cluster can be described using parameters such as a center, an area, a region, a radius and/or an angle range of the cluster.

Figure 8:
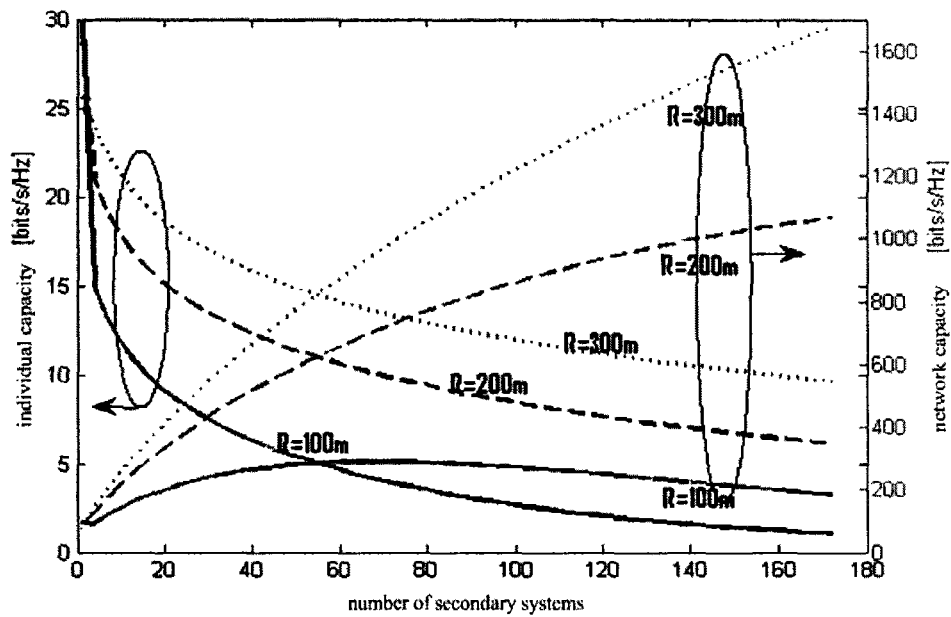
FIG. 8 is a schematic diagram showing a relationship between the size of a secondary system cluster and an individual secondary system capacity.
Figure 9:
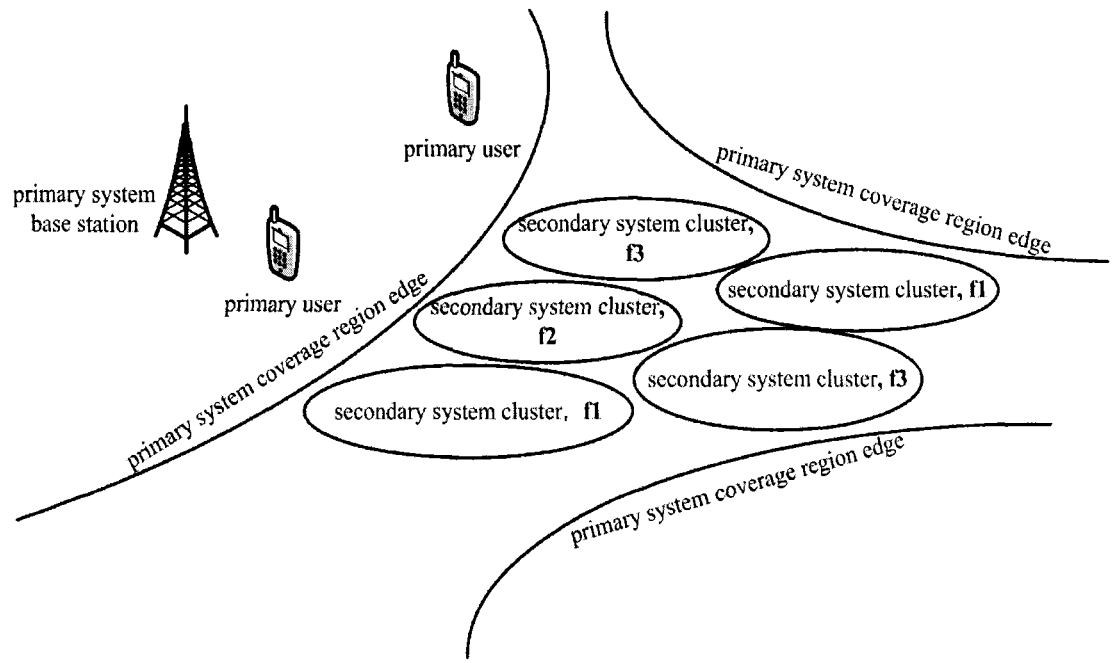
FIG. 9 is a schematic diagram showing a frequency resource configuration for respective secondary system clusters.

Various clustering criteria can be used to cluster the secondary systems. For example, according to an embodiment, the secondary systems can be clustered into secondary system clusters according to the estimation for the density of the secondary systems, such that the distribution of the secondary systems in each cluster is uniform. For another example, according to another embodiment, when clustering the secondary systems, the channel models between secondary systems at different locations in each cluster are made to be consistent with each other as far as possible. According to another embodiment, when clustering the secondary systems, it is possible to make the channel models between respective secondary systems at different locations to the primary system be consistent with each other as far as possible. In another embodiment, when the secondary systems are clustered, it is possible to consider configuring the size of the radius of each cluster. When the radius of the cluster increases, the individual secondary system capacity and the network capacity will also increase. FIG. 8 shows the relationship between the size of the cluster and the individual secondary system capacity. As shown in FIG. 8, the larger the radius R of the cluster is, the larger the individual secondary system capacity and the network capacity are. However, an oversized cluster will lead to reduction of the number of clusters in a certain region, and accordingly the reduction of the times of multiplexing of the frequency bands. FIG. 9 is a schematic diagram showing the frequency resource configuration for respective secondary system clusters. As shown in FIG. 9, the frequency bands f1 and f3 are multiplexed twice respectively. If the area of the cluster is reduced (the radius of the cluster is reduced), the number of clusters in this region can be creased while the time of multiplexing of frequency bands is accordingly increased. Therefore, when clustering the secondary systems, the radius of each cluster can be configured according to the actual needs (such as the density of the secondary systems, the number of available frequency bands and so on). For example, if the density of the secondary systems is large, the radius of the cluster can be reduced appropriately; otherwise, the radius of the cluster can be increased. For another example, in the case that the number of available frequency bands is fixed, if it is desired to reduce the times of multiplexing of frequency bands, the radius of the cluster can be increased appropriately; otherwise, the radius of the cluster can be reduced appropriately. Those skilled in the art should appreciate that the specific value of the radius of the cluster can be set according to the actual needs, and the disclosure is not limited to a particular radius value. As a specific embodiment, if frequency band multiplexing exists between the secondary system clusters, then during the formation of the secondary system clusters, the same-frequency interference between secondary system clusters should be made to be as small as possible. The above gives some criterions for clustering the secondary systems. It should be understood that the clustering can be made using one or a combination of more of the criterions described above, which will not be described in detail herein.

As described above, the secondary system cluster can be described using the center and the radius of the cluster. The center of the cluster can be represented by GPS (Global Positioning System) coordinates, and can also be represented by a certain address. Table 1 shows an example of information about the secondary system clusters.

TABLE 1

Information about secondary system cluster

| Secondary system cluster | Description of cluster region | Available frequency band | Maximum transmission power of each secondary system | Optimal upper limit $N_o$ of number of activated secondary systems corresponding to number K of frequency spectrums | | Other information |
|---|---|---|---|---|---|---|
| 1 | center: Tiananmen square; Radius: 1000 m | f1<br>f2 | 80 mW<br>100 mW | K = 1<br>$N_o$ = 50 | K = 2<br>$N_o$ = 70 | Frequency band priority f2 > f1 |
| 2 | Center: East longitude 121 degrees 39 minutes 09.14 seconds, north latitude 31 degrees 48 minutes 31.16 seconds; radius: 3000 m | f4 | 120 mW | K = 1<br>$N_o$ = 70 | | |

Figure 2:
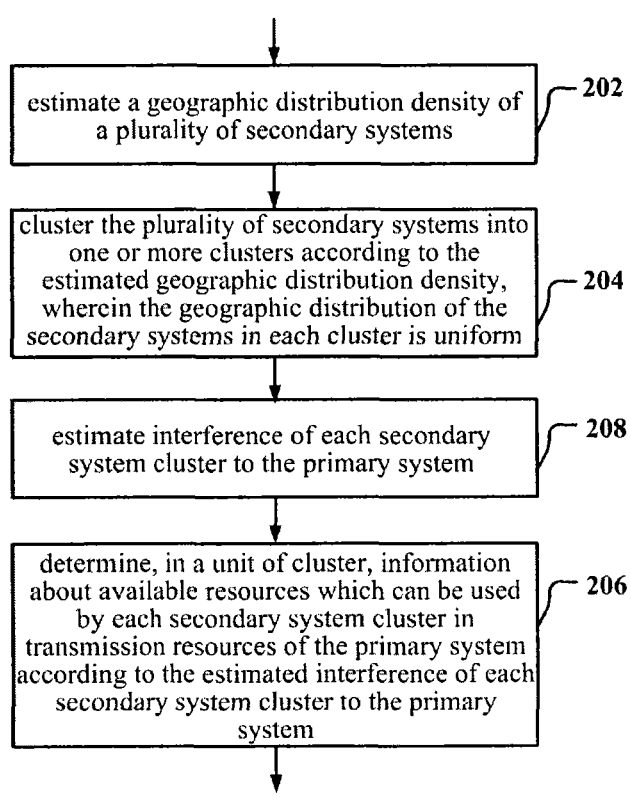
FIG. 2 is a schematic flow chart of a wireless transmission resource management method according to another embodiment of the disclosure.

FIG. 2 is a schematic flow chart of a wireless transmission resource management method according to another embodiment of the disclosure. The embodiment in FIG. 2 differs from the embodiment shown in FIG. 1 in that, after the clustering of secondary systems, the interference of each secondary system cluster to the primary system is also estimated, and the available transmission resources are configured for each secondary system cluster according to this interference.

As shown in FIG. 2, the wireless transmission resource management method includes steps 202, 204, 208 and 206.

The steps 202 and 204 can be similar to the processes of the steps 102 and 104 described above, respectively, which will not be described in detail herein.

In step 208, the interference of each secondary system cluster to the primary system can be estimated.

As one example, the interference of each secondary system cluster to the primary system can be obtained by estimating the interference of each secondary system in the secondary system cluster to the coverage region edge of the primary system. Specifically, the interference of each secondary system to the primary system can be estimated, then a weighted sum, an average or a median of the interferences of respective secondary systems in the cluster to the primary system are calculated as the interference of the secondary system cluster to the primary system.

Figure 3:
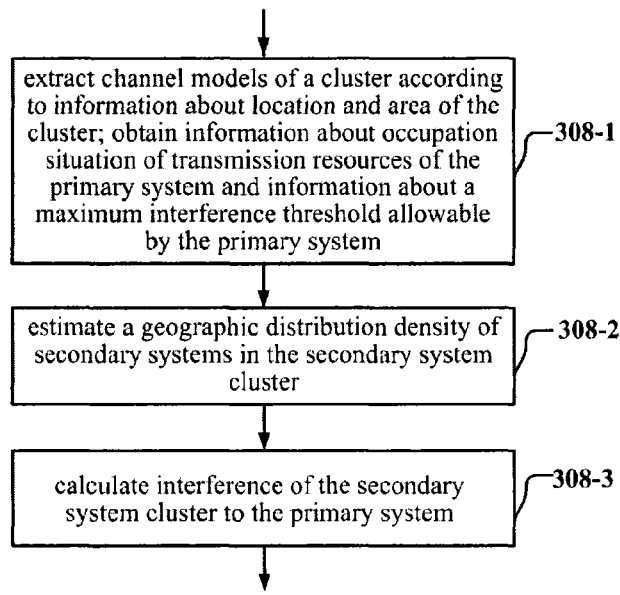
FIG. 3 is a schematic flow chart of an example of a method for estimating interference of a secondary system cluster to a primary system.

FIG. 3 is a schematic flow chart of an example of a method for estimating the interference of the secondary system cluster to the primary system.

As shown in FIG. 3, in step 308-1, the channel model of the secondary system cluster can be extracted according to information about location and area of the secondary system cluster. As an example, the wireless transmission resource management apparatus may be provided with a channel model database (not shown in figure) which stores therein channel models of secondary systems in respective geographical regions. Information about the occupancy of transmission resources (e.g., frequency spectrums) of the primary system and information about the maximum interference threshold that the primary system can tolerate can also be obtained. Specifically, the information about the occupancy of frequency spectrums of the primary system (e.g., the coverage range, the transmit power, the frequency band usage situation, the frequency band usage time of the primary system) and the information about the maximum interference threshold that the primary system can tolerate can be obtained by accessing a base station (e.g., a frequency spectrum database provided in the base station of the primary system) of the primary system through a communication device.

Then, in step 308-2, the geographic distribution density of secondary systems in a secondary system cluster is estimated. For example, the geographic distribution density λ of the secondary systems in the cluster can be estimated by the following formula:

$$\lambda = \frac{\text{number of secondary systems in cluster}}{\text{area of cluster}}. \quad (2)$$

Then, in step 308-3, the interference of the secondary system cluster to the primary system is calculated.

Some examples of the interference of the secondary system cluster to the primary system are described below.

Figure 4:
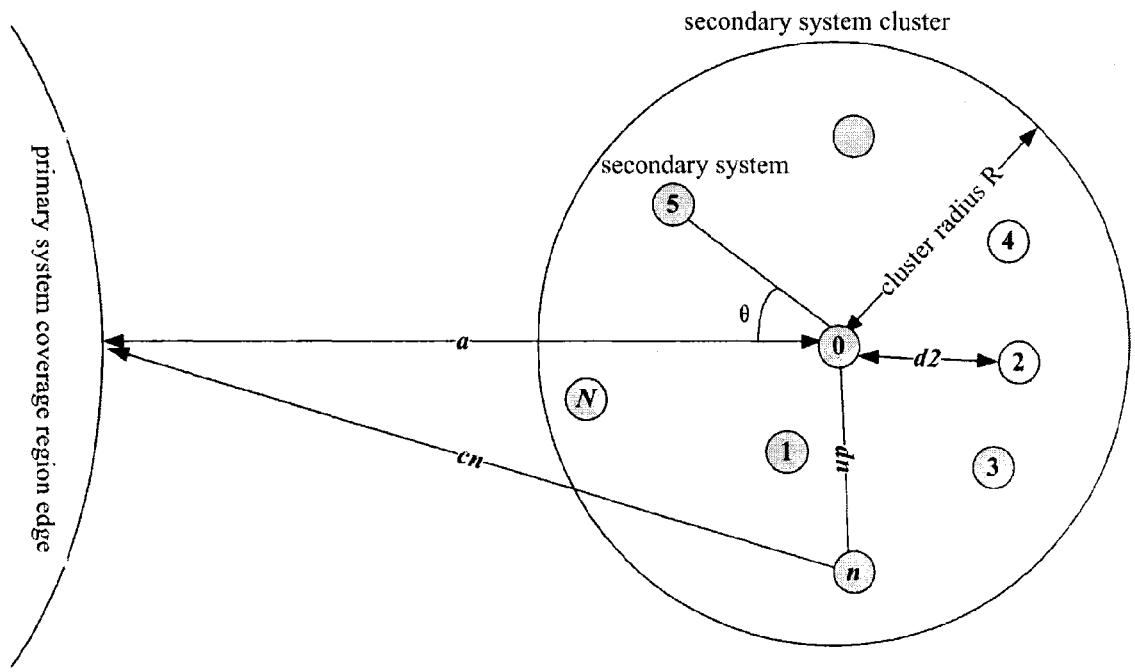
FIG. 4 is a schematic diagram showing the modeling for interference of a secondary system cluster to a primary system.

FIG. 4 is a schematic diagram showing the modeling for the interference of the secondary system cluster to the primary system. As shown in FIG. 4, the closest distance of the center of the cluster to the coverage region of the primary system is a (e.g., which is calculated according to the distance of the center of the secondary system cluster to the edge of the coverage region of the primary system). The radius of the cluster is R. In the example shown, the cluster is schematically shown as a circle. Of course, the shape of the region of the cluster may be a sector with a given angle Φ, or other shape, which is not defined here. A certain secondary system in the cluster is numbered as 0. Other secondary systems in the cluster are numbered in an ascending order of their distance to the secondary system 0, that is, the secondary system 1 is the first neighbor of the secondary system 0. The distance from the secondary system 0 to the secondary system n is $d_n$. The distribution density function of $d_n$ can be expressed as:

$$f_{dn}(x) = e^{-\lambda \Phi x^2} \frac{2(\lambda \Phi x^2)^n}{x \Gamma(n)}. \quad (3)$$

In the above formula, $f_{dn}(x)$ represents the distribution density function of $d_n$, that is, the probability that the distanced $d_n$ from the n-th neighbor of the secondary system 0 to the secondary system 0 is any given value x is $f_{dn}(x)$. λ represents the distribution density of the secondary systems. Φ represents the angle range of the secondary system cluster. If the cluster is a circle, the aperture angle thereof is 2π, x represents any given value, and Γ(n) represents the factorial of n.

The distance $c_n$ from the secondary system n (n=1, 2, ..., N) to the coverage region of the primary system can be calculated by the following formula:

$$c_n = \sqrt{a^2 + d_n^2 - 2ad_n \cos\theta} \quad (4).$$

In the above formula, θ represents an included angle between a direction from the secondary system 0 to the n-th adjacent secondary system thereof and a direction from the secondary system 0 to the coverage region of the primary system, which is in an uniform distribution in the range of 0~Φ. It can be assumed that the distance from the secondary system 0 to the coverage region of the primary system is $c_0$=a.

Assuming that the power transmission of the secondary system n is $P_n$, the interference I of the secondary system to the edge of the coverage region of the primary system can be calculated by the following formula:

$$I = \Sigma_0^N c_n^{-\alpha} P_n \quad (5).$$

Figure 5:
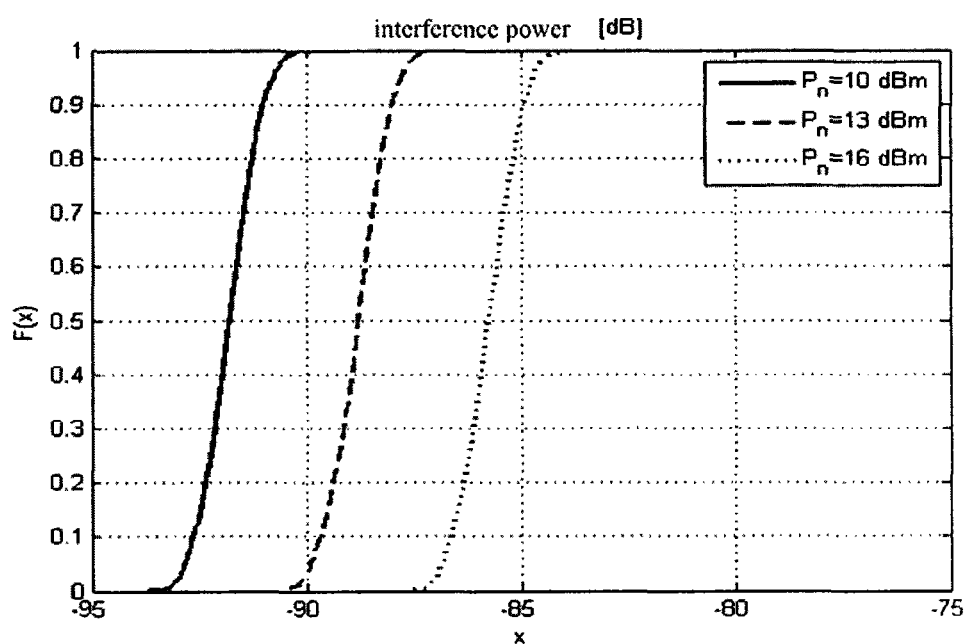
FIG. 5 is a schematic diagram showing interference of a secondary system cluster to a primary system in the case that the secondary systems use different transmission powers.

In the above formula, α represents a path fading index which can be obtained by comparing the actual signal transmission environment with a typical transmission environment and by means of the path fading index of the typical transmission environment. α=2 represents a free space transmission model. Here only the transmission path fading is considered. Other parameters such as large-scale fading and small-scale fading can also be added in this model, which will not be described in detail herein. It can be seen from formula (5) that, since the location of the secondary system is random, $c_n$ is dynamic, and thus the interference of the secondary system cluster to the primary system is dynamic. Moreover, $P_n$ may also be a variable since the secondary system adopts dynamic power control. For example, FIG. 5 is a schematic diagram showing the interference of the secondary system cluster to the primary system in the case that the secondary systems adopt different transmission powers. In FIG. 5, it is assumed that a=500, R=100, N=4, and in the formula (5), α=4. It can be seen that, when $P_n$=16 dBm, the possibility that the interference of the secondary system cluster to the primary system exceeds −85 dB is 10%.

As an example, when considering there are multiple available frequency bands K (i.e., K>1) for the secondary systems, each secondary system dynamically select one frequency band from the available frequency bands to avoid using the same frequency band with its closest neighbor. A certain secondary system uses a frequency band in the K available frequency bands which is different from the frequency bands that used by its first K−1 neighbors. Then when there are N secondary systems in the cluster, the number of the neighbor secondary systems in the same frequency state is $$L = \left\lceil \frac{N}{K} \right\rceil.$$

Therefore, the secondary system which is in the same frequency state with the certain secondary system is its lk-th neighbor (l=1, 2, . . . L; L represents the number of the secondary systems in the same-frequency state). The formula (5) can be rewritten as:

$$I_{SS2PS} = \Sigma_{l=1}^{L} c_l^{-\alpha} P_l \qquad (6).$$

$I_{SS2PS}$ represents the interference of the secondary system cluster to the primary system.

The above shows an example of a method for estimating the interference of the secondary system cluster to the primary system. It should be understood that these examples are illustrative and not restrictive. Any other appropriate method can be used to estimate the interference of the secondary system cluster to the primary system, and the disclosure should not be limited to the above examples.

After the interference of each secondary system cluster to the primary system is estimated, in step 206, the information about available resources which can be used by each secondary system cluster in transmission resources of the primary system can be determined in a unit of cluster according to the estimated interference of each secondary system cluster to the primary system.

Specifically, the transmission powers of respective secondary systems can be adjusted according to the estimated interference of each secondary system cluster to the primary system and the maximum interference threshold or requirement (e.g., ensuring the probability that the interference of the secondary system cluster to the primary system exceeds a given threshold does not exceed 5%, or the probability that the intensity of signals of the primary system exceeds the interference and noises when there is interference to the primary system is no less than 95%) allowable by the primary system, such that the interference of the secondary system cluster to the primary system meet the requirement, thus configuring the available resource information for each cluster.

In the embodiment shown in FIG. 2, during the configuration of available transmission resources for the secondary systems, the interference of respective secondary system clusters to the primary system is considered in a unit of cluster, thus the interference of each secondary system cluster to the primary system when the secondary system cluster gets the configured transmission resources can meet the requirement of the primary system, which further optimizes the resource configuration described above.

As a preferred embodiment, the information about available resources which can be used by each secondary system cluster in the case that the secondary system cluster includes a different number of activated secondary systems can also be obtained according to the maximum interference threshold of the primary system. Specifically, the available resources for the secondary system cluster in the case that the secondary system cluster contains a different number of activated secondary systems can be calculated. Specifically, the information about the available resources which can be used by each secondary system cluster in the case that the secondary system cluster includes a different number of activated secondary systems includes information about a relationship between the number of activated secondary systems in the secondary system cluster and an available maximum transmission power, available transmission resources, the number of the available transmission resources and available time periods of each secondary system in the secondary system cluster. By obtaining the information about available resources which can be used by the secondary system cluster in the case that the secondary system cluster includes a different number of activated secondary systems, when the number of the activated secondary systems in the secondary system cluster changes, this information can be directly used to adjust the available resources for the secondary system cluster, making resource configuration and updating more convenient and fast.

Figure 6:
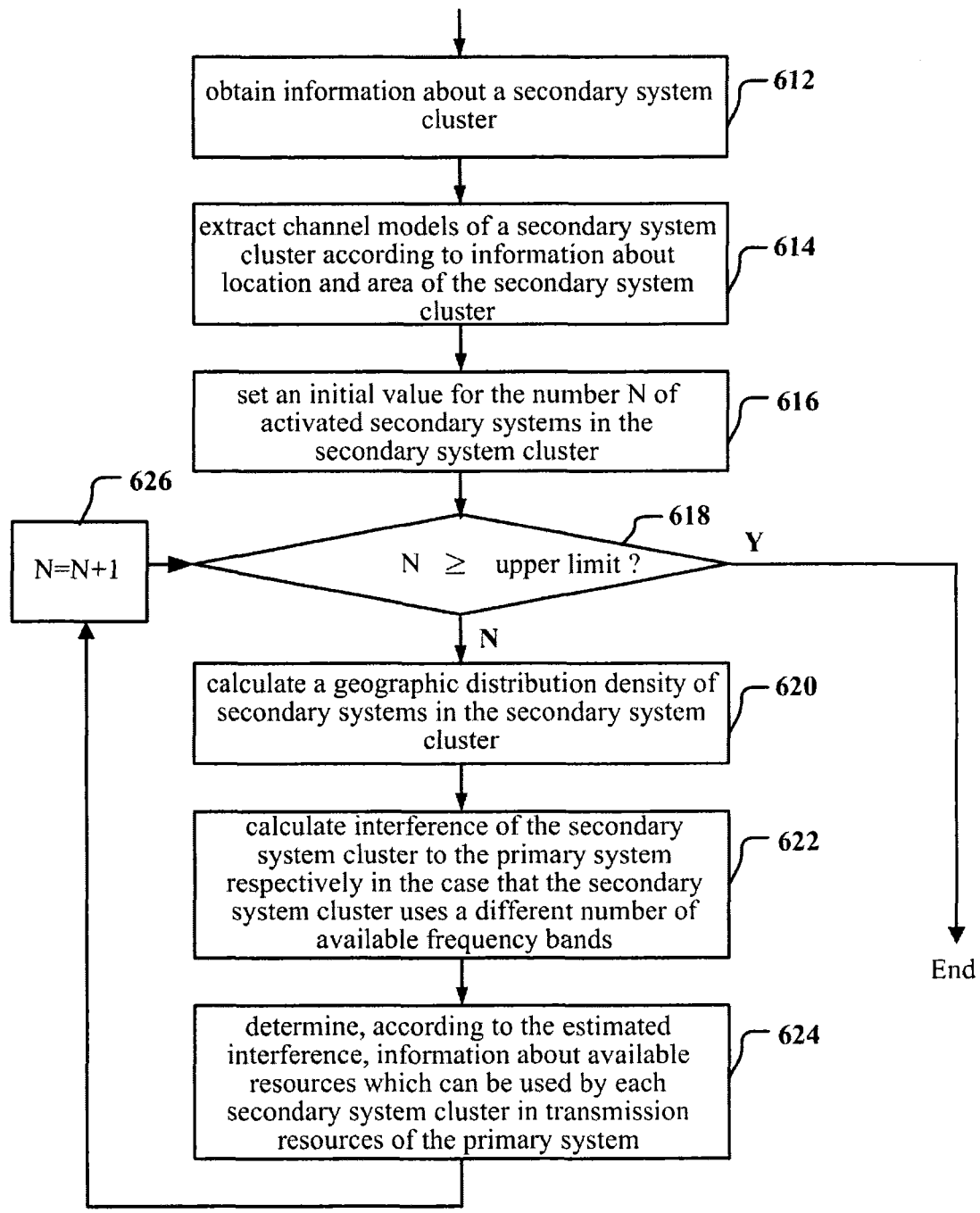
FIG. 6 is a schematic flow chart of an example of a method for computing available frequency spectrums of a secondary system cluster in the case that the secondary system cluster contains a different number of activated secondary systems.

FIG. 6 is a schematic flow chart of a specific example of a method for calculating available frequency spectrums of a secondary system cluster in the case that the secondary system cluster contains a different number of activated secondary systems.

As shown in FIG. 6, the information about the secondary system cluster is acquired in step 612.

The information about the secondary system cluster may include one or more of the following information: (a) region information of the secondary system cluster, such as the center position, the area, the region, the radius and/or angle of the cluster; (2) the range of number of activated secondary systems in the cluster, the range of transmission power of the secondary systems in the cluster, and the desired frequency spectrum usage time period of the secondary systems in the cluster; (3) the system parameters of the individual secondary system, such as power control mode (fixed power; dynamic power control for maintaining a stable Signal-to-Noise at the reception side; etc.); and (4) the frequency spectrum usage strategy of the individual secondary system. For example, the secondary system can automatically use other frequency bands to avoid the same-frequency interference when the secondary system is aware of a frequency band used by an adjacent secondary system. Assuming that the number of candidate frequency bands available for the second system is K, the above situation can be described as that when one secondary system is aware of the frequency band used by an adjacent secondary system, the secondary system can use other K−1 frequency bands to avoid the same-frequency interference. The region information of the secondary system cluster can be obtained by for example the clustering of the secondary systems described above, which will not be described in detail herein. Other information (2)-(4) about the secondary system cluster can be obtained from the operators of the secondary systems, which will not be described in detail herein.

In step 614, the channel model of the secondary system cluster can be extracted according to information about location and area of the secondary system cluster. As an example, the wireless transmission resource management apparatus may be provided with a channel model database (not shown in figure) which stores therein channel models of secondary systems in respective geographical regions. Information about the occupancy of transmission resources (e.g., frequency spectrums) of the primary system and information about the maximum interference threshold that the primary system can tolerate can also be obtained. Specifically, the information about the occupancy of transmission resources of the primary system (e.g., the coverage range, the transmit power, the frequency band usage situation and the frequency band usage time of the primary system) and the information about the maximum interference threshold that the primary system can tolerate can be obtained by accessing the base station of the primary system (e.g., a frequency spectrum database provided in the base station of the primary system) through a communication device.

In step 616, an initial value of the number of the activated secondary systems in the secondary system cluster is set according to the range of the number of the activated secondary system in the secondary system cluster. For example, a lower limit of the range of the number can be set as the initial value.

In step 618, it is decided whether the number of the activated secondary systems in the cluster is equal to or greater than an upper limit of the range of the number of the activated secondary systems in the secondary system cluster. If yes, then the process ends. If not, the process proceeds to step 620.

In step 620, the geographic distribution density of the secondary systems in the secondary system cluster is calculated. This step is similar to the step 308-2 described above, which will not be described in detail herein.

In step 622, assuming that there are K available frequency bands for the secondary system cluster, the interferences of the secondary system cluster to the primary system in the case that the secondary system cluster uses a different number of available frequency bands k (k=1, 2, . . . , K) are calculated respectively, and in step 624, according to the estimated interference, the information about available resources which can be used by each secondary system cluster in transmission resources of the primary system is determined. Step 622 and step 624 are respectively similar to the step 308-3 and the step 206 described above, which will not be described in detail herein.

In step 626, the number of the activated secondary systems in the secondary system cluster is added by one, and the process returns to step 618.

The table 2 below is a table showing the maximum transmission power of the secondary system when the individual secondary system uses different bandwidth at different times in the case that the secondary system cluster contains a different number of activated secondary systems, which is obtained by the method in FIG. 6.

TABLE 2

Table of available frequency spectrum resources of a secondary system cluster corresponding to a certain candidate frequency band

| (number of activated secondary systems in cluster is N, number of candidate frequency bands of each secondary system is K) | Maximum transmission power of individual secondary system at respective time periods in case of different bandwidths (dBm) | | |
| --- | --- | --- | --- |
| | Time period 1:00 to 2:00 | | Time period 15:20 to 17:10 |
| | Band-width = 5 MHz | Band-width = 10 MHz | Band-width = 5 MHz ... |
| (1, 1) | 38 | 33 | 23 |
| (2, 1) | 36 | 31 | 21 |
| (2, 2) | 37 | 32 | 22 |
| ... | | | |
| (10, 1) | 30 | 25 | 15 |
| (10, 2) | 32 | 27 | 17 |
| ... | | | |

In Table 1, the maximum transmission power is used to indicate the parameter of the power control on the secondary system. It should be understood that this is only an example and any other parameters may also be used to indicate to the power control on the secondary system. For example, if a dynamic power control is used for the secondary system, other parameters (such as a constant Signal-to-Noise which is desired to be output) can be used to describe the limitation to the power control on the secondary system.

Figure 10:
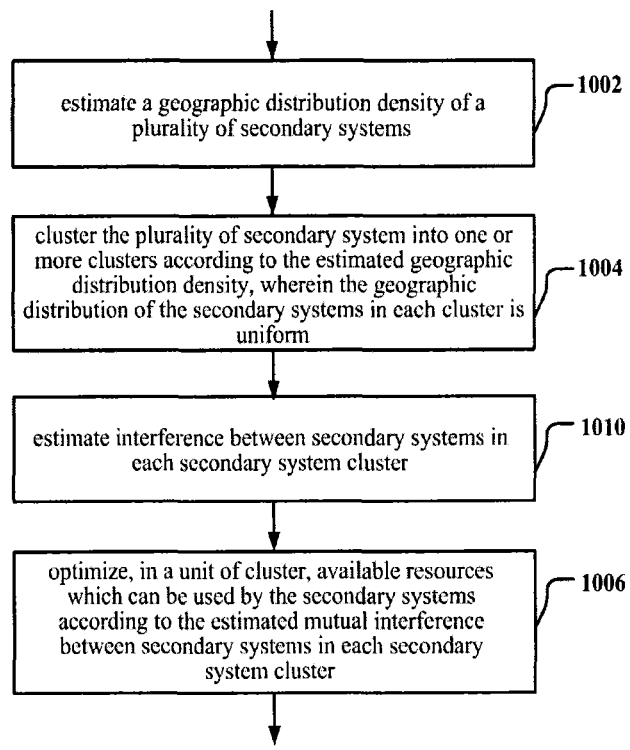
FIG. 10 is a schematic flow chart of a wireless transmission resource management method according to another embodiment of the disclosure.

FIG. 10 is a schematic flow chart of a wireless transmission resource management method according to another embodiment of the disclosure. The embodiment in FIG. 10 differs from the embodiment shown in FIG. 1 in that, after the secondary systems are clustered, the interference between secondary systems in each secondary system cluster is also estimated, and the available transmission resources are configured for each secondary system cluster according to this interference.

As shown in FIG. 10, the wireless transmission resource management method includes steps 1002, 1004, 1010 and 1006.

Steps 1002 and 1004 may be similar to the processes of the steps 102 and 104 described above, respectively, which will not be described in detail herein.

In step 1010, the intra-cluster interference of each secondary system cluster is estimated, that is, the mutual interference between respective secondary systems in the cluster is estimated.

Any appropriate method may be used to estimate the mutual interference between the respective secondary systems in the cluster.

Figure 11:
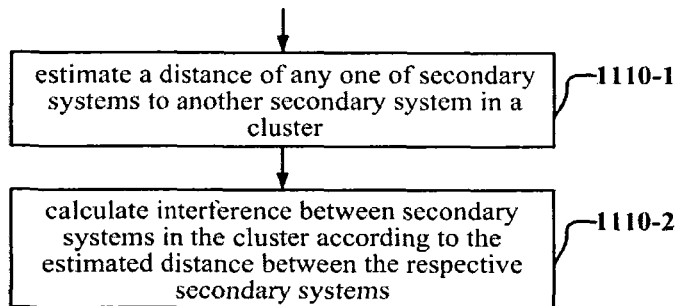
FIG. 11 is a schematic flow chart of an example of a method for estimating mutual interference between respective secondary systems in a cluster.

FIG. 11 illustrates an example of a method for estimating mutual interference between the respective secondary systems in the cluster. As shown in FIG. 11, first, in step 1110-1, a distance $d_n$ of any secondary system to the other n-th secondary system in the cluster is estimated. The distance $d_n$ of the any secondary system to the n-th secondary system in the cluster can be generated according to the above formula (3). Then, in step 1110-2, the interference between respective secondary systems can be calculated according to the estimated distance value. For example, assuming that the path fading index from the secondary system to other secondary system is β, this parameter can be obtained by comparing the actual signal transmission environment with the typical transmission environment and by means of the path fading index of the typical transmission environment. When the number of neighbor secondary systems which use the same frequency as this secondary system is $$L = \left\lceil \frac{N}{K} \right\rceil,$$

the interference $I_{SS2SS}$ between the secondary systems can be calculated by the following formula:

$$I_{SS2SS} = \Sigma_{l=1}^{L} d_l^{-\beta} P_l \quad (7).$$

In the above formula, $d_l$ represents a distance from the secondary system to the l-th neighbor secondary system using the same frequency as the secondary system, $P_l$ represents a transmission power of l neighbor secondary systems using the same frequency as the secondary system. Here a Monte Carlo method can be used to generate a distance between secondary systems which follow the distribution of the formula (2), then $I_{SS2SS}$ is calculated from the formula (7). Then the average of $I_{SS2SS}$ is calculated.

Figure 12:
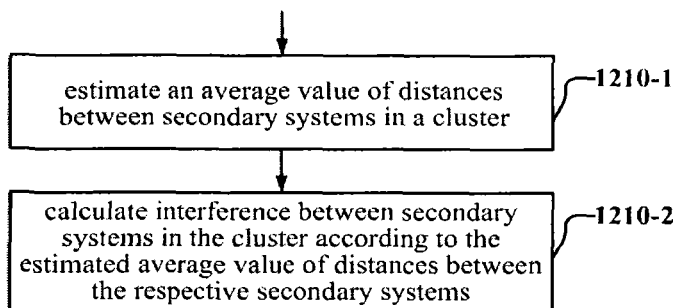
FIG. 12 is a schematic flow chart of another example of a method for estimating mutual interference between respective secondary systems in a cluster.

FIG. 12 shows another example of a method for estimating mutual interference between respective secondary systems in a cluster. As shown in FIG. 12, first, in step 1210-1, the average of the distances between respective secondary systems in the cluster is calculated. For example, the distances between respective secondary systems can be calculated by the formula (2) described above, then the average of these distances are calculated. For another example, the average $E(d_n)$ of the distances between secondary systems can be calculated directly by the formula (8):

$$E(d_n) = \left(\frac{1}{\lambda\Phi}\right)^{\frac{1}{2}} \frac{\Gamma\left(n+\frac{1}{2}\right)}{\Gamma(n)}. \tag{8}$$

In the above formula, $\lambda$ represents the distribution density of the secondary systems, $\Phi$ represents an angle range of the secondary system cluster, and $\Gamma(n)$ represents the factorial of n.

Then, in step 1210-2, the interference between respective secondary systems in the cluster can be estimated using the average of the distances. For example, the interference between secondary systems can be calculated by the formula (9):

$$I_{SS2SS} = \Sigma_{l=1}^{L} \{E(d_l)\}^{-\beta} P_l \tag{9}.$$

The above describes some examples of a method for estimating the interference between respective secondary systems. It should be understood that these examples are illustrative and not restrictive. Other appropriate methods may be used to estimate the interference between the respective secondary systems in the cluster, which is not defined here.

After the interference between respective secondary systems in the cluster is obtained, in step 1006, the available resources which can be used by the secondary systems are optimized in a unit of cluster according to the estimated mutual interference between the respective secondary systems in each secondary system cluster.

In the embodiment shown in FIG. 10, when configuring the available transmission resources for the secondary systems, the interference between respective secondary systems in respective secondary system clusters is considered in a unit of cluster, thus further optimizing the above resource configuration.

Figure 13:
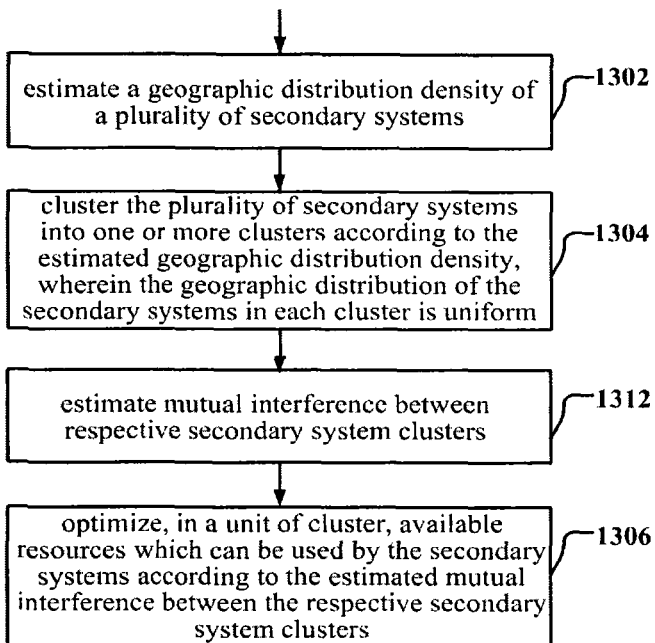
FIG. 13 is a schematic flow chart of a wireless transmission resource management method according to another embodiment of the disclosure.

FIG. 13 is a schematic flow chart of a wireless transmission resource management method according to another embodiment of the disclosure. The embodiment shown in FIG. 13 differs from the embodiment shown in FIG. 1 in that, after the secondary systems are clustered, the interference between respective secondary system clusters is also estimated, and the available transmission resources are configured for each secondary system cluster according to this interference.

As shown in FIG. 13, the wireless transmission resource management method includes steps 1302, 1304, 1312 and 1306.

Step 1302 and Step 1304 may be similar to the processes of step 102 and step 104 described above, respectively, which will not be described in detail herein.

In step 1312, the mutual interference between respective secondary system clusters is estimated. Any appropriate method may be used to estimate the mutual interference between respective secondary system clusters. The interference between secondary system clusters can be described as the interference $I_{CLUSTER}$ of one secondary system cluster to the edge of another secondary system cluster, which is similar to the interference model of the secondary system cluster to the primary system. That is to say, the method for estimating the interference of the secondary system cluster to the primary system can be used to estimate the interference between secondary system clusters, which will not be described in detail herein.

Then, in step 1306, the available resources which can be used by the secondary systems can be optimized in a unit of cluster according to the estimated mutual interference between respective secondary system clusters.

In the embodiment shown in FIG. 13, when the available resources are configured for the secondary systems, the interference between respective secondary systems in respective secondary system clusters is considered in a unit of cluster, and thus the resource configuration described above is further optimized.

As a preferred embodiment, step 1306 or 1006 may include: obtaining, according to the estimated mutual interference between respective secondary systems in each secondary system cluster and/or the estimated mutual interference between respective secondary system clusters, the maximum value of the number of activated secondary systems in each secondary cluster in the case that available resources of the secondary system cluster and the number of the available resources of the secondary system cluster are fixed.

Figure 14:
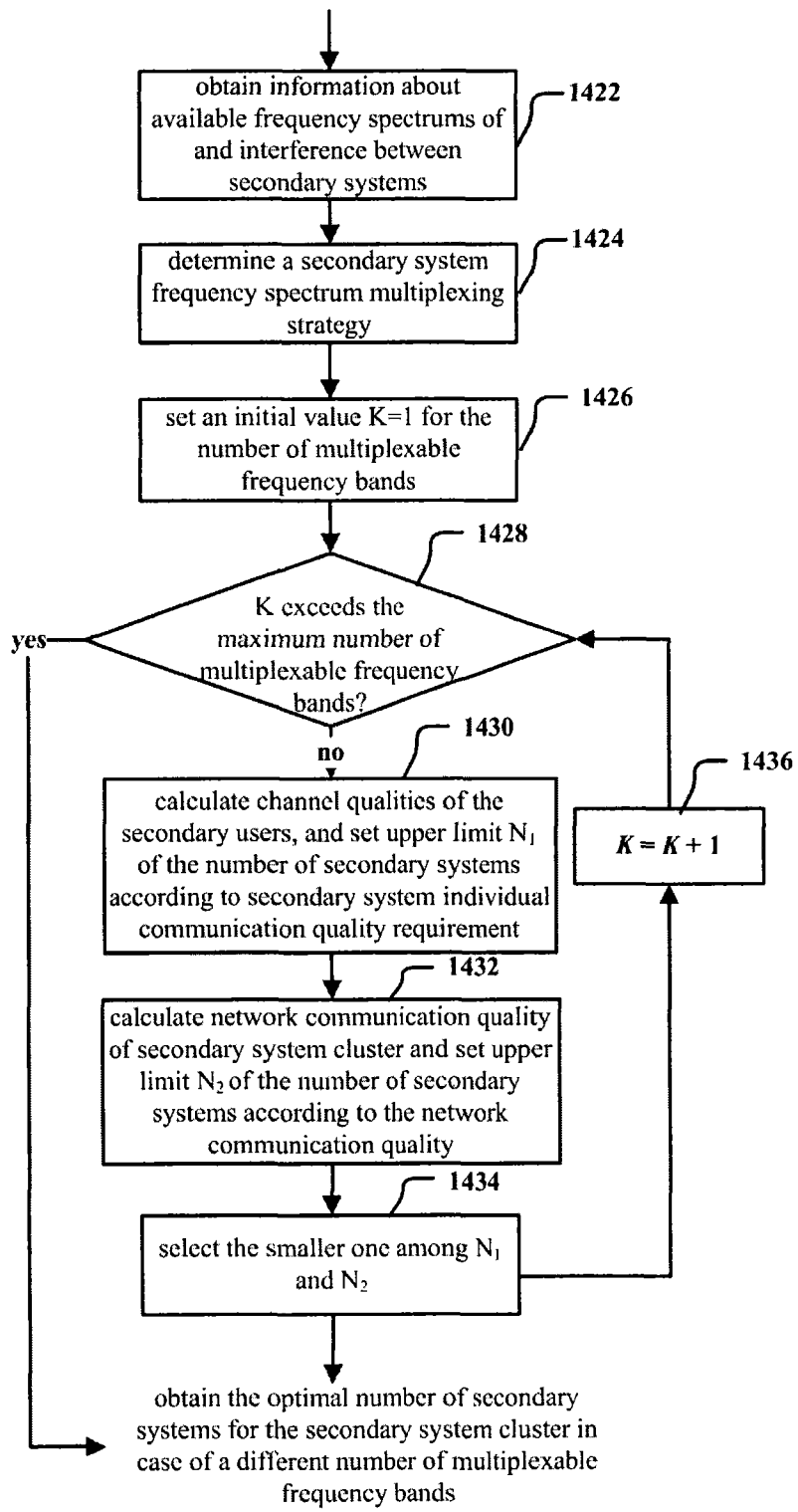
FIG. 14 is a schematic flow chart of an example of a method for optimizing transmission resources of secondary system clusters.

FIG. 14 shows an example of a method for optimizing the transmission resources of the secondary system cluster.

As shown in FIG. 14, first, in step 1422, the information about the available frequency spectrums of the secondary systems (e.g., the information shown in Table 2, which can be obtained using the method described above, which will not be described in detail herein) and the information about the interference between respective secondary systems in the cluster in the case that the secondary system cluster contains a different number of secondary systems and has a different number of available frequency bands are obtained (the information can be obtained using the method described above, which will not be described in detail herein).

Then, in step 1424, the frequency spectrum multiplexing strategy of the secondary systems is determined. For example, if the secondary system has three available frequency bands represented by f1, f2 and f3 respectively, the priorities of the usage of these frequency bands can be set for the secondary system, for example f2>f1>f3. Namely the secondary system uses the frequency band f2 preferentially, and when the frequency band is insufficient, the frequency bands f1 and f2 are used. In the same manner, the number of frequency bands to be used is increased gradually. The priorities of different frequency bands can be specified according to specific situations such as the transmission effect, channel capacity, operating costs and/or frequency band usage fees of respective frequency bands, which will not be described in detail herein.

Next, the optimal strategy of the frequency spectrum utilization of the secondary systems in case of a different number of available frequency bands is estimated.

Specifically, in step 1426, the initial value of the number of the available frequency bands is set, i.e., K=1. In step 1428, it is decided whether the number K of the available frequency bands exceeds the maximum value of the number of the frequency bands that can be multiplexed. If yes, then the process ends. If not, then the process proceeds to step 1430.

In step 1430, the communication quality of the secondary system in case of a different number of secondary systems is estimated, and the upper limit $N_1$ of the number of activated secondary systems in the cluster is set according to the requirements for the communication quality of the individual secondary system.

The communication quality of the secondary system can be estimated using various parameters, such as bit error rate and channel capacity. Here, the channel capacity is taken as an example. If there is only one secondary system over one frequency band, then the channel capacity of the secondary system can be written as:

$$C = \log_2\left(1 + \frac{g^{-\beta} P_{SS}}{I_{PS} + I_{Cluster} + \partial_n^2}\right). \quad (10)$$

Here, g represents a distance between a transmitter and a receiver in a secondary system. $P_{SS}$ is the maximum transmission power of the secondary system over this frequency band (e.g., Table 2). In addition, $I_{PS}$ is the interference of the primary system to the secondary system. By accessing the primary system frequency spectrum database, the transmission power of the primary system and the geographical location of the transmitter can be obtained. Then according to the channel transmission models between the primary system and the secondary systems, the interference of the primary system to the secondary systems can be calculated. $\partial_n^2$ represents the Gaussian white noise energy of the receiver of the secondary system. When there are K secondary systems over this frequency band, the individual communication quality of the l-th secondary system can be calculated by the following formula due to the interference between secondary systems in the cluster:

$$C = \log_2\left(1 + \frac{g^{-\beta} P_l}{I_{PS} + I_{Cluster} + \partial_n^2}\right). \quad (11)$$

Figure 15:
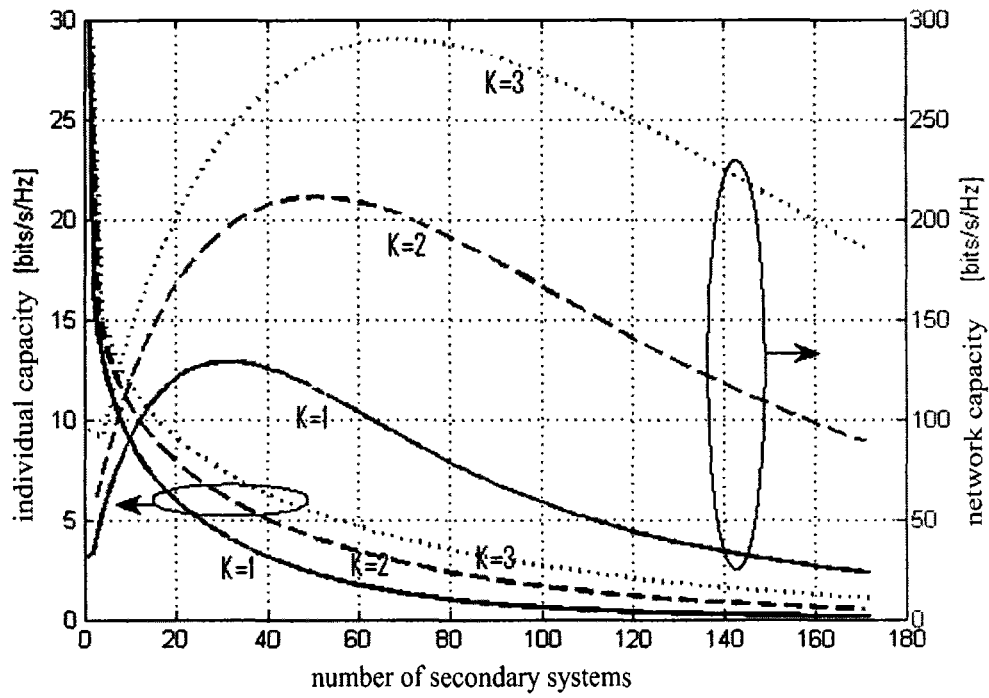
FIG. 15 is a schematic diagram showing an example of an individual channel capacity in the case that the secondary systems use different available frequency bands.

In the formula, $p_l$ represents the maximum transmission power of the l-th secondary system. FIG. 15 shows an example of the individual channel capacity in the case that the secondary system uses a different number of available frequency bands (bits/second/Hz). As can be observed from FIG. 15 that the channel quality of the secondary system is reduced with the increase of the number of the secondary systems in the cluster, and increases with the increase of the number of the available frequency bands of the secondary systems. In actual applications, it needs to reduce the number of occupied frequency spectrums as much as possible while ensuring the communication quality of the secondary systems to meet the minimum requirement. Assuming that the minimum requirement of the channel capacity of the secondary system is 5 bits/s/Hz, it can be seen from FIG. 15 that, one frequency band can contain 25 secondary systems. When the number of the secondary systems exceeds 25, the channel capacity of the secondary systems will be less than the minimum requirement. Therefore, the number of the available frequency bands may be increased in the system, that is, two frequency bands are used at the same time and at the same time the secondary system is allowed to dynamically select an available frequency band, so as to ensure that the frequency bands of the adjacent secondary systems are different. So the secondary system cluster can contain 40 secondary systems. In the same manner, when the number of the secondary systems exceeds 60, the secondary systems should use 3 frequency bands to ensure meeting the minimum requirement of the secondary system. Therefore, the maximum value of the number of the secondary systems in case of a different number K=1, 2, 3 of available frequency bands is N1=25, 40, 60.

In step 1432, the network communication quality of the secondary system cluster is calculated, and the upper limit $N_2$ of the number of activated secondary systems in the cluster can be set according to the network communication quality. The network communication quality $C_{NET}$ of the secondary system cluster can be estimated using the channel capacity parameter by the following formula:

$$C_{NET} = K \sum_{l=1}^{L} \log_2\left(1 + \frac{g_l^{-\beta} p_l}{I_{PS} + I_{Cluster} \sum_{j=1}^{L-1} \varepsilon\{d_l^{-a}\} p_j + \partial_n^2}\right). \quad (12)$$

In the above formula, $g_l$ represents a distance between a transmitter and a receiver in the l-th secondary system.

FIG. 15 gives a curve of the secondary system network capacity. It can be observed from FIG. 15 that the secondary system network capacity first increases and then reduces with the increase of number of the secondary systems. This is because the interference between secondary systems gets larger and larger when the number of the secondary systems is increased continually (the density of the secondary systems in the cluster gets larger and larger). Therefore, the maximum value of the number of secondary systems which is considered from the perspective of the network capacity of the secondary system can be obtained according to the curve. In addition, the secondary system network capacity increases as the increase of the number of the available frequency spectrums of the secondary systems. When there is only one available frequency band, K=1, if the number of the secondary systems exceeds 30, the secondary system network capacity is decreased. The secondary system cluster should increase the number of the available frequency bands, and allow the secondary system to dynamically use the available frequency bands to ensure its available frequency band is different from that of its adjacent secondary system. Therefore, from the perspective of network capacity, the maximum number of the secondary systems which can be contained is $N_2$=30, 50, 70 in case of a different number K=1, 2, 3 of available frequency bands.

Then, in step 1434, the larger one between N1 and N2 is selected as the number of activated secondary systems in the secondary system cluster. In step 1436, the number K of available frequency bands of the secondary systems can be added by one, and the process returns to step 1428 to repeat the processing. Thus, for a different number of available frequency bands of the secondary systems, the corresponding number of activated secondary systems can be obtained. For example, the number of activated secondary systems is $N_0$=25, 40, 60, respectively in case of the number of available frequency bands of the secondary systems K=1, 2, 3.

In the above process, if a different value of the parameter is used, the individual network capacity curve and the network capacity curve of the cluster will change. In this case, the embodiments of the disclosure are also applicable. Using this optimization manner, the number of the frequency bands which are used by the secondary systems are decreased as much as possible according to the number of the secondary systems in the cluster while ensuring the interference to the primary system does not exceed the maximum interference that the primary system can tolerant and meeting the requirement for the individual communication quality of the secondary system, thus the frequency band resources can be saved.

The above describes some embodiments and examples showing the management and optimization of the wireless transmission resources of the secondary systems. In the subsequent process, the usage of resources of the secondary systems can also be further controlled and updated.

Figure 16:
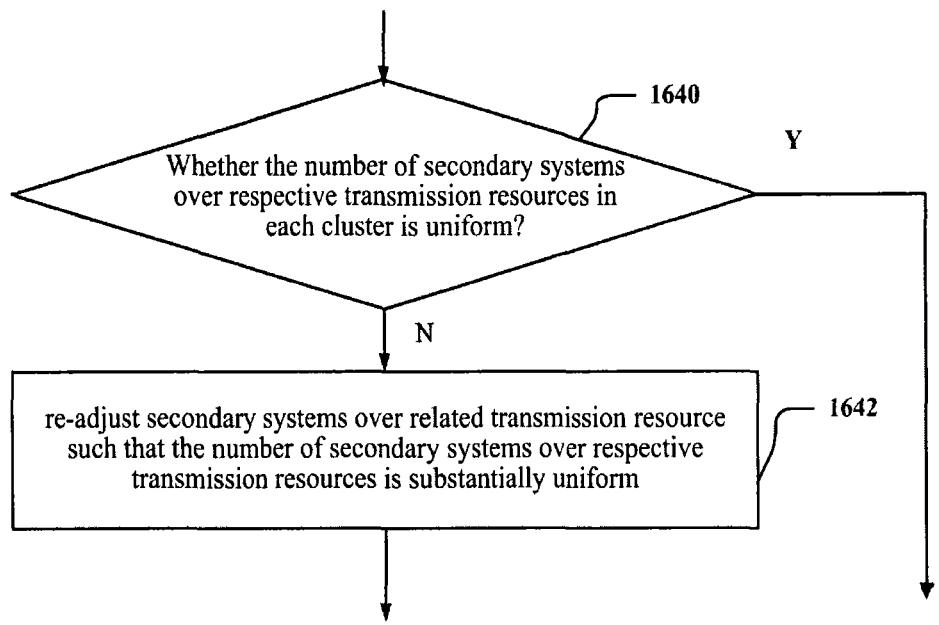
FIG. 16 is a schematic diagram showing a method for controlling transmission resources of secondary systems according to an embodiment.

FIG. 16 is a schematic diagram of a method for controlling the transmission resources of the secondary systems according to an embodiment. As shown in FIG. 16, in step 1640, it is decided whether the number of the secondary systems over respective available resources of each secondary system cluster is uniform. If not, then in step 1642, the secondary systems over the related available resources are re-adjusted, such that the number of the secondary systems over the respective available resources is uniform, i.e. such that the numbers of the secondary systems over respective transmission resources (such as respective frequency bands) are substantial the same. For example, it may be suggested to re-adjust the frequency of the secondary systems and set the priory of respective frequency bands. If yes, the adjustment is not performed.

Figure 17:
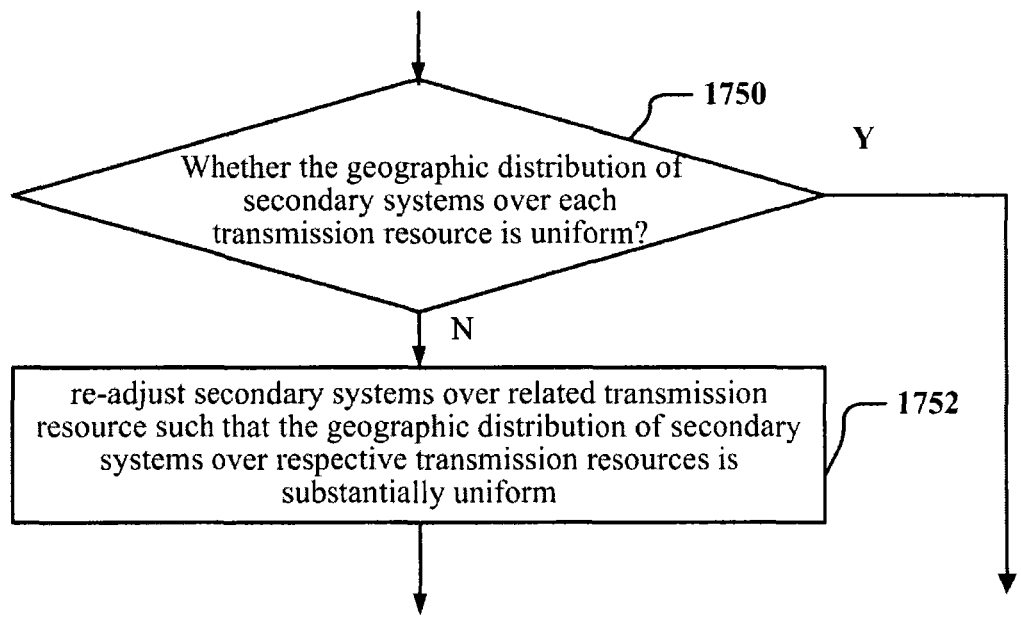
FIG. 17 is a schematic diagram showing a method for controlling transmission resources of secondary systems according to another embodiment.

FIG. 17 is a schematic diagram showing a method for controlling the transmission resources of the secondary systems according to another embodiment. As shown in FIG. 17, in step 1750, it is decided whether the geographic distribution of the secondary systems over each available resource is uniform. If not, then in step 1752, the secondary systems over the related available resource are re-adjusted, such that the geographic distribution of the secondary systems over respective available resources is uniform. For example, the frequency bands used by the secondary system randomly selected in a certain region are forced to change, such that the geographic distribution of the secondary systems over the respective available transmission resources is substantially uniform. If yes, the adjustment is not performed.

Figure 18:
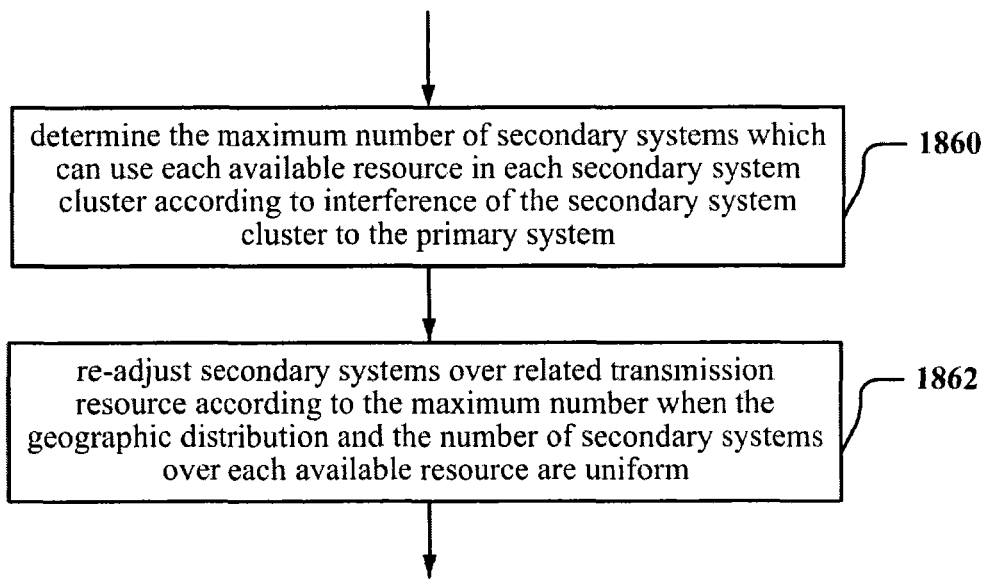
FIG. 18 is a schematic diagram showing a method for controlling transmission resources of secondary systems according to another embodiment.

FIG. 18 is a schematic diagram showing a method for controlling the transmission resources of the secondary systems according to another embodiment. As shown in FIG. 18, in step 1860, the maximum number of the secondary systems in each secondary system cluster which can use each available resource is determined according to the interference of the secondary system cluster to the primary system. Further, when the geographic distribution and the number of the secondary systems over each available resource are uniform, in step 1862, the number of the available resources in the secondary system cluster is re-adjusted according to the maximum number. If the number of the secondary systems in the secondary system cluster exceeds the maximum value of the number of the secondary systems in case of a certain given number K of the frequency bands, the secondary systems in the cluster can be instructed to add one new available frequency band and perform a dynamic frequency band selection. If the number of the frequency bands reaches the maximum value, it means that the performance will be decreased when the number of the secondary systems in the cluster is increased. If the number of secondary systems in the secondary system cluster is less than the maximum value of the number of the secondary system which is less than the current value K, the number of frequency bands is decreased. For example, when the number of available frequency bands of the secondary systems as calculated above is K=1, 2, 3, the number of activated secondary systems is $N_0$=25, 40, 60, respectively. If K=1 and there are 30 secondary systems, the number of the frequency bands is increased to K=2. If there are 30 secondary systems and K=3, the number of the frequency bands is decreased to K=2.

In an embodiment, the secondary system can dynamically select the available frequency bands in the secondary system cluster, but the usage of the frequency band is subject to the management and control of the secondary system frequency spectrum manager. For example, the secondary system can send a resource usage request to the frequency spectrum manager, for example, send location information of the secondary system by using the frequency spectrum utilizing enabler thereof. When the request is received by the frequency spectrum manager, the frequency spectrum manager notifies the secondary system of the transmission resources (frequency spectrums) which can be used by the secondary system. Then, the secondary system can dynamically select transmission resources according to the available transmission resources. The secondary system performs a dynamical selection to the usage of the resources to ensure the selected transmission resource is different from the transmission resources used by the adjacent secondary systems. Further, the secondary system reports the selected transmission resource to the frequency spectrum manager, so that the frequency spectrum manager determines whether the distribution of the secondary systems in the cluster is uniform and whether the usage of the spectrum resources is uniform. When receiving the control information (such as changing the frequency bands, increasing the number of the frequency bands, and power control) sent from the frequency spectrum manager of the secondary system, the secondary system performs the system adjustment. For example, the secondary system can decide whether the number of the available resources has changed. If yes, it is required to update the information about available resources and perform a dynamic selection of the available resources, for example increasing or decreasing the number of the selectable frequency bands and changing the transmission power of the secondary system. If not, the usage situation of the resources is changed according to the control information.

The following describes a wireless transmission resource management apparatus of some embodiments of the disclosure.

Figure 19:
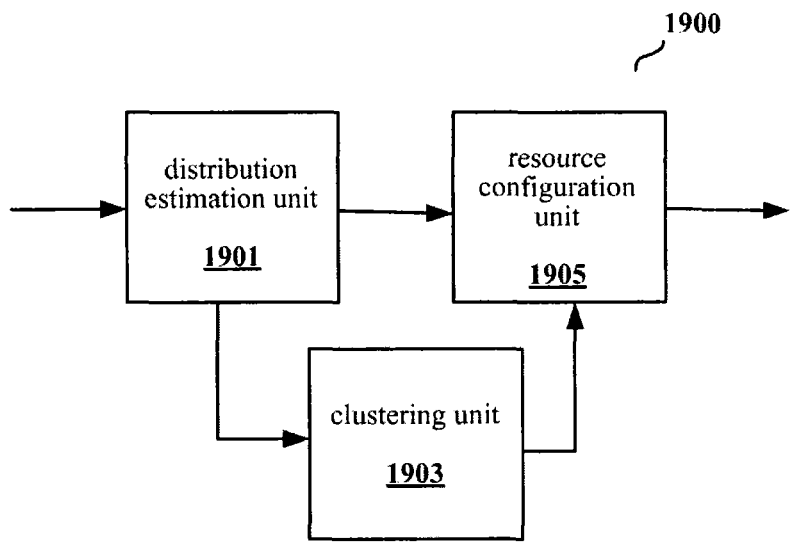
FIG. 19 is a schematic block diagram of a wireless transmission resource management apparatus according to an embodiment of the disclosure.

FIG. 19 is a schematic block diagram of a wireless transmission resource management apparatus according to an embodiment of the disclosure. The wireless transmission resource management apparatus may be for example a frequency spectrum manager which manages the transmission resources (such as frequency spectrums) of the secondary systems. The frequency spectrum manager may be provided in a network server, or provided in a certain access point which is responsible for managing other access points.

As shown in FIG. 19, the wireless transmission resource management apparatus 1900 includes a distribution estimation unit 1901, a clustering unit 1903 and a resource configuration unit 1905.

The distribution estimation unit 1901 is configured to estimate a geographic distribution density of a plurality of secondary systems. Specifically, the distribution estimation unit 1901 is configured to estimate a geographic distribution density of secondary systems in an activated state. The distribution estimation unit 1901 can adopt the methods described in the above respective embodiments or examples to estimate the geographic distribution density, which will not be repeated herein.

The clustering apparatus 1903 is configured to cluster the plurality of secondary systems into one or more clusters according to the estimated geographic distribution density, such that the geographic distribution of respective secondary systems in each cluster is uniform.

The respective secondary system cluster can be described using parameters such as a center, an area, a region, a radius and/or an angle range of the cluster, which is not defined here.

The clustering unit 1903 can adopt any appropriate method to perform clustering, as long as the geographic distribution of the secondary systems in respective secondary system cluster is uniform. For example, the clustering can be performed using the method described in the above embodiments or examples, which will not be repeated herein.

After the respective secondary systems are clustered by the clustering unit 1903, the resource configuration unit 1905 can determine, in a unit of cluster, information about available resources which can be used by the secondary systems in transmission resources of the primary system. That is to say, the available transmission resources are configured for the respective secondary systems in a unit of cluster which has a uniform distribution.

In the embodiment shown in FIG. 19, the geographic distribution of the secondary systems in each secondary system cluster is made to be uniform. In this way, when the configuration and management for the transmission resources of the secondary systems is made in a unit of cluster, the usage of transmission resources can be further optimized.

As another preferred embodiment, the wireless transmission resource management apparatus 1900 can further include a channel model obtaining unit (not shown in FIG. 19) configured to obtain channel models between respective secondary systems. Thus, the clustering unit 1903 can cluster the secondary systems according to the channel models between respective secondary systems and the geographic distribution density of the respective secondary systems, such that not only the geographic distribution of the respective secondary systems in each cluster is uniform, but also the channel models between the respective secondary systems in each cluster are substantially consistent with each other. The channel models between the respective secondary systems can be estimated according to the terrain and building distribution and structures in the geographic region where these secondary systems are located. The wireless transmission resource management apparatus can obtain these information from the operators of the secondary systems in advance and then estimate the channel models. Alternatively, the wireless transmission resource management apparatus can obtain information about the channel models between the respective secondary systems from the operators of the secondary systems, and store the information into its storage unit. Using such embodiment, when the configuration and the management for the secondary systems are made in a unit of cluster, the utilization of the transmission resources can be further optimized.

As another preferred embodiment, the channel model obtaining unit can be configured to obtain the channel model between each secondary system and the primary system. Thus, the clustering unit 1903 can cluster the secondary systems according to the channel models between respective secondary systems and the primary system and the geographic distribution density of the respective secondary systems, such that not only the geographic distribution between the respective secondary systems in each cluster is uniform, but also the channel models between the respective secondary systems in each cluster and the primary system are substantially consistent with each other. The channel model between the secondary system and the primary system refers to a channel model between the secondary system and the coverage region of the primary system, and can be estimated according to the terrain and building distribution and structures from the secondary system to the coverage region of the primary system. For example, the wireless transmission resource management apparatus can obtain these information from the operators of the secondary systems and the primary system in advance, and then estimate the channel models. The wireless transmission resource management apparatus can obtain information about the channel models between the respective secondary systems and the primary system from the operators of the secondary systems, and store the information in its storage unit. Using such embodiment, when the configuration and management for the transmission resources of the secondary systems is made in a unit of cluster, the utilization of the transmission resources can be further optimized.

According to an embodiment, the clustering unit 1903 can adopt various clustering criterions to cluster the secondary systems. For example, according to an embodiment, the secondary systems can be clustered into secondary system clusters according to the estimation for the density of the secondary systems, such that the distribution of the secondary systems in each cluster is uniform. For another example, according to another embodiment, when the secondary systems are clustered, the channel models between secondary systems at different positions in each cluster are made to be consistent as far as possible. According to another embodiment, when the secondary systems are clustered, it is possible to make the channel models between respective secondary systems at different locations in each cluster to the primary system be consistent with each other as far as possible. In another embodiment, when the secondary systems are clustered, it is possible to consider configuring the size of the radius of each cluster. When the radius of the cluster increases, the individual secondary system capacity and the network capacity will also increase. FIG. 8 shows the relationship between the size of the cluster and the individual secondary system capacity. As shown in FIG. 8, the larger the radius R of the cluster is, the larger the individual secondary system capacity and the network capacity are. However, an oversized cluster will lead to reduction of the number of clusters in a certain region, and accordingly the reduction of the times of multiplexing of the frequency bands. FIG. 9 is a schematic diagram showing the frequency resource configuration for respective secondary system clusters. As shown in FIG. 9, the frequency bands f1 and f3 are multiplexed twice respectively. If the area of the cluster is reduced (the radius of the cluster is reduced), the number of clusters in this region can be increased while the times of multiplexing of frequency bands is accordingly increased. Therefore, when clustering the secondary systems, the radius of each cluster can be configured according to the actual needs (such as the density of the secondary systems, and the number of available frequency bands). For example, if the density of the secondary systems is relatively large, the radius of the cluster can be reduced appropriately; otherwise, the radius of the cluster can be increased. For another example, in the case that the number of available frequency bands is fixed, if it is desired to reduce the times of multiplexing of frequency bands, the radius of the cluster can be increased appropriately; otherwise, the radius of the cluster can be reduced appropriately. Those skilled in the art should appreciate that the specific value of the radius of the cluster can be set according to the actual needs, and the disclosure is not limited to a particular radius value. As a specific embodiment, if frequency band multiplexing exists between the secondary system clusters, then during the formation of the secondary system clusters, the same-frequency interference between secondary system clusters should be made to be as small as possible. The above gives some criterions for clustering the secondary systems, it should be understood that the clustering unit 1903 can adopt one or a combination of the criterions described above to perform clustering, which will not be described in detail herein.

Figure 20:
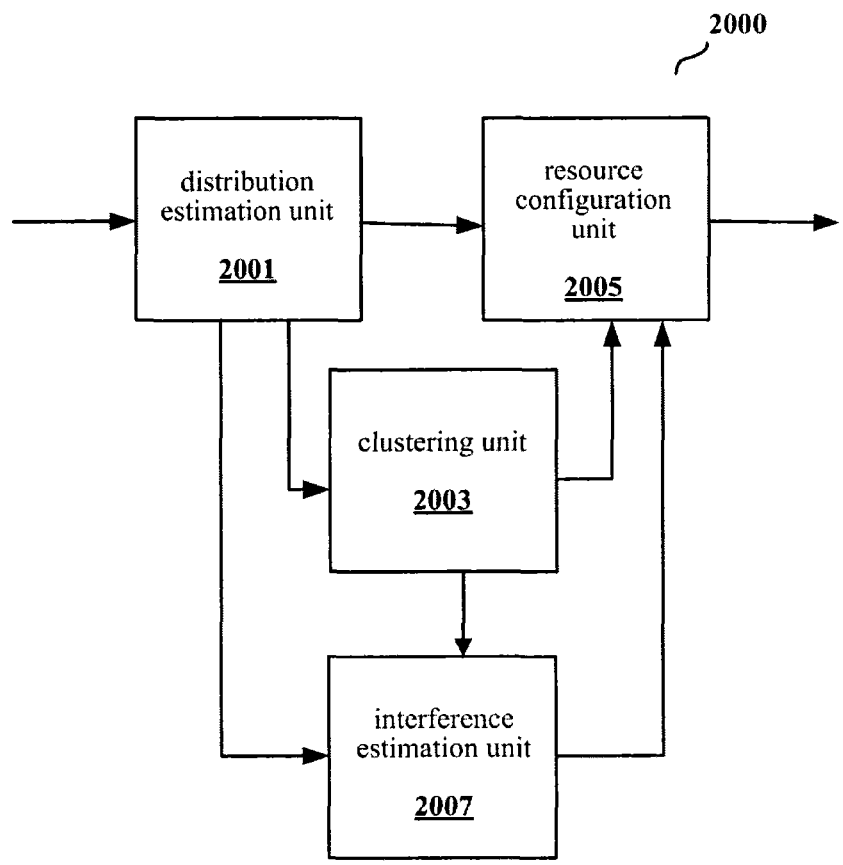
FIG. 20 is a schematic block diagram of a wireless transmission resource management apparatus according to another embodiment of the disclosure.

FIG. 20 is a schematic block diagram of a wireless transmission resource management apparatus according to another embodiment of the disclosure. The embodiment shown in FIG. 20 differs from the embodiment shown in FIG. 19 in that, in addition to the distribution estimation unit 2001, the clustering unit 2003 and the resource configuration unit 2005, the wireless resource management apparatus 2000 further includes an interference estimation unit 2007.

The distribution estimation unit 2001, the clustering unit 2003 and the resource configuration unit 2005 have functions similar to the functions of the distribution estimation unit 1901, the clustering unit 1903 and the resource configuration unit 1905, respectively, which will not be repeated herein.

The interference estimation unit 2007 can estimate the interference of each secondary system cluster to the primary system. The interference estimation unit 2007 can adopt the methods described in the above embodiments or examples to estimate the interference of each secondary system cluster to the primary system. For example, the interference estimation unit 2007 can obtain the interference of the cluster to the primary system by estimating the interference of each secondary system to the edge of the coverage region of the primary system, which will not be repeated herein.

After the interference of each secondary system cluster to the primary system is obtained, the resource configuration apparatus 2005 can determine information about available resources which can be used by each secondary system cluster in transmission resources of the primary system in a unit of cluster, according to the estimated interference of each secondary system cluster to the primary system.

Specifically, the resource configuration unit 2005 can adjust the transmission powers of respective secondary systems according to the estimated interference of each secondary system cluster to the primary system and the maximum interference threshold or requirement (e.g., ensuring the probability that the interference of the secondary system cluster to the primary system exceeds a given threshold does not exceed 5%, or the probability that the intensity of signals of the primary system exceeds the interference and noises when there is interference to the primary system is 95%) allowable by the primary system, such that the interference of the secondary system cluster to the primary system meets requirements, thus configuring the available resource information for each cluster.

In the embodiment shown in FIG. 20, during the configuration of available transmission resources for the secondary systems, the interference of respective secondary system clusters to the primary system is considered in a unit of cluster, thus the interference of each secondary system cluster to the primary system when the secondary system cluster is configured with the transmission resources meet the requirement of the primary system, which further optimizes the resource configuration described above.

As a preferred embodiment, the resource configuration unit 2005 or 1905 can also obtain the information about available resources which can be used by each secondary system cluster in the case that the secondary system cluster includes a different number of activated secondary systems, according to the maximum interference threshold of the primary system. Specifically, the resource configuration unit 2005 or 1905 can calculate the available resources for the secondary system cluster in the case that the secondary system cluster contains a different number of activated secondary systems. Specifically, the information about the available resources which can be used by each secondary system cluster in the case that the secondary system cluster includes a different number of activated secondary systems includes information about a relationship between the number of activated secondary systems in the secondary system cluster and an available maximum transmission power, available transmission resources, the number of the available transmission resources and available time periods of each secondary system in the secondary system cluster. By obtaining the information about available resources which can be used by the secondary system cluster in the case that the secondary system cluster includes a different number of activated secondary systems, when the number of activated secondary systems in the secondary system cluster changes, this information can be directly used to adjust the available resources for the secondary system cluster, making resource configuration and updating more convenient and fast.

Figure 21:
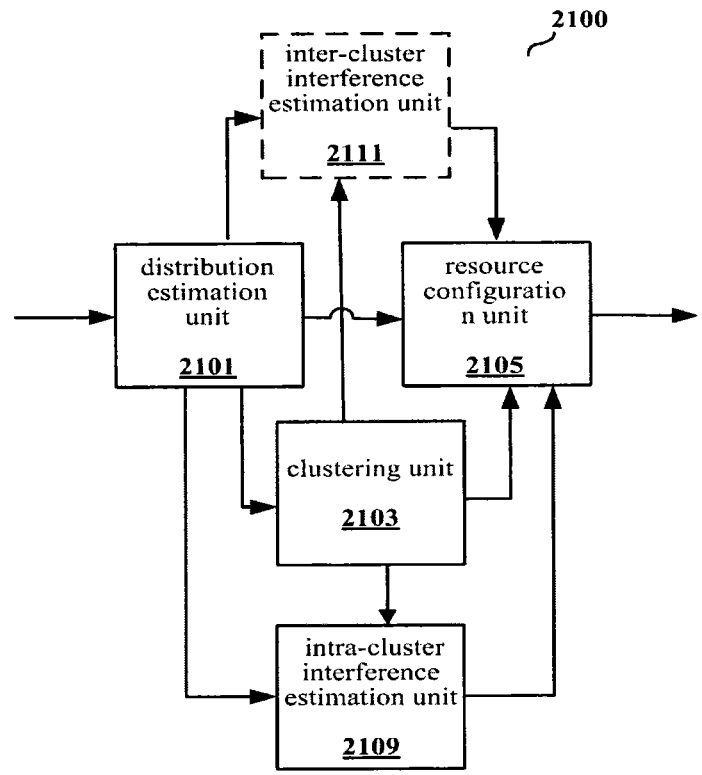
FIG. 21 is a schematic block diagram of a wireless transmission resource management apparatus according to another embodiment of the disclosure.

FIG. 21 is a schematic block diagram of a wireless transmission resource management apparatus according to another embodiment of the disclosure. The embodiment shown in FIG. 21 differs from the embodiment shown in FIG. 19 in that, in addition to the distribution estimation unit 2101, the clustering unit 2103 and the resource configuration unit 2105, the wireless transmission resource management apparatus 2100 further includes an intra-cluster interference estimation unit 2009.

The distribution estimation unit 2101, the clustering unit 2103 and the resource configuration unit 2105 have functions respectively similar to the functions of the distribution estimation unit 1901, the clustering unit 1903 and the resource configuration unit 1905 described above, which will not be repeated herein.

The intra-cluster interference estimation unit 2009 is configured to estimate the intra-cluster interference of each secondary system cluster, i.e. to estimate the mutual interference between respective secondary systems in the cluster. The intra-cluster interference estimation unit 2009 can adopt any appropriate method to estimate the mutual interference between the respective secondary systems in the cluster, such as adopting the method described in the above respective embodiments or examples to estimate the intra-cluster interference, which will not be repeated herein.

After the interference between respective secondary systems in the secondary system cluster is estimated, the resource configuration unit 2005 can optimize, in a unit of cluster, the available resources which can be used by the secondary systems according to the estimated mutual interference between respective secondary systems in each secondary system cluster.

In the embodiment shown in FIG. 21, when configuring the available transmission resources for the secondary systems, the interference between respective secondary systems in respective secondary system clusters is considered in a unit of cluster, thus further optimizing the resource configuration described above.

In another embodiment, the wireless transmission resource management apparatus 2100 may also include an inter-cluster interference estimation unit 2011. The inter-cluster interference estimation unit 2011 is configured to estimate the mutual interference between respective secondary system clusters. The inter-cluster interference estimation unit 2011 may employ any appropriate method to estimate the mutual interference between the respective secondary systems in the cluster. The interference between the secondary system clusters can be described as interference $I_{CLUSTER}$ of one secondary system cluster to another secondary system cluster, which is similar to the interference model between a secondary system cluster and a primary system. That is to say, the inter-cluster interference estimation unit 2011 may employ the method described above for estimating the interference of the secondary system cluster to the primary system to estimate the interference between secondary system clusters, which will not be repeated herein. Thus, the resource configuration unit 2105 can optimize, in a unit of cluster, the available resources which can be used by the secondary systems according to the estimated mutual interference between respective secondary system clusters. In this embodiment, when configuring the available transmission resources for the secondary systems, the interference between respective secondary systems of respective secondary system clusters is considered, thus further optimizing the resource configuration described above.

As a preferred embodiment, the resource configuration unit 2105 can obtain the maximum value of the number of activated secondary systems in each secondary cluster in the case that available resources of the secondary system cluster and the number of the available resources of the secondary system cluster are fixed, according to the estimated mutual interference between respective secondary systems in each secondary system cluster and/or the estimated mutual interference between respective secondary system clusters. For example, the method shown in FIG. 14 can be employed to perform this estimation, which will not be repeated herein.

Figure 22:
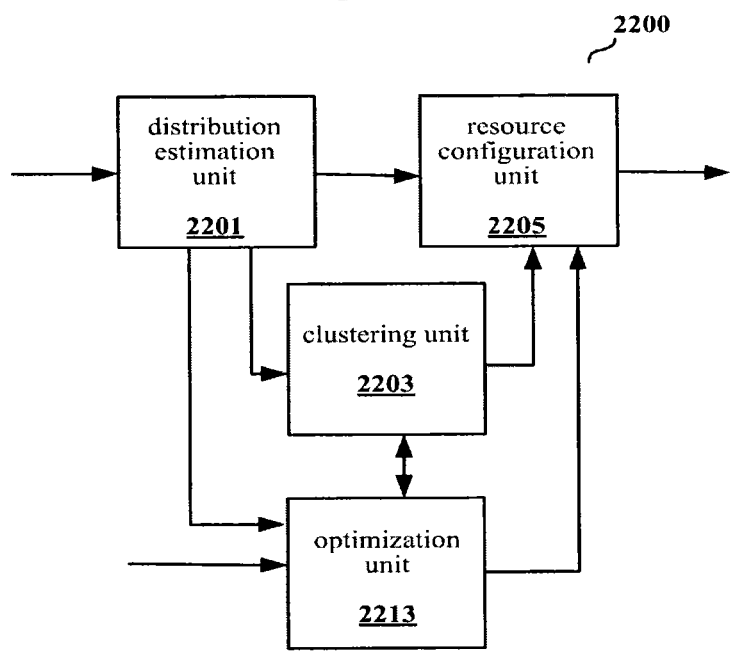
FIG. 22 is a schematic block diagram of a wireless transmission resource management apparatus according to another embodiment of the disclosure.

FIG. 22 is a schematic block diagram of a wireless transmission resource management apparatus according to another embodiment of the disclosure. The embodiment shown in FIG. 22 differs from the embodiment shown in FIG. 19 in that, in addition to the distribution estimation unit 2201, the clustering unit 2203 and the resource configuration unit 2205, the wireless transmission resource management apparatus 2200 further includes an optimization unit 2213.

The distribution estimation unit 2201, the clustering unit 2203 and the resource configuration unit 2205 have functions respectively similar to the functions of the distribution estimation unit 1901, the clustering unit 1903 and the resource configuration unit 1905 described above, respectively, which will not be repeated herein.

The optimization unit 2213 can decide whether the number of secondary systems over respective available resources in each secondary system cluster is uniform. If not, the secondary systems over the related available resource are re-adjusted such that the number of the secondary systems over the respective available resources is substantially uniform, that is, such that the numbers of the secondary systems over respective transmission resources (e.g. respective frequency bands) are substantially the same. For example, it may be suggested to adjust the frequency of the secondary system, and set the priority for respective frequency bands. If yes, the adjustment is not performed.

In another embodiment, the optimization unit 2213 can also decide whether the geographic distribution of the secondary systems over each available resource is uniform. If not, the secondary systems over the related available resource are re-adjusted, such that the geographic distribution of the secondary systems over respective available resources is substantially uniform. For example, the frequency bands used by the secondary systems randomly selected in a certain region are forced to change, such that the geographic distribution of the secondary systems over the respective available transmission resources is substantially uniform. If yes, the adjustment is not performed.

In another embodiment, the optimization unit 2213 can also determine the maximum number of the secondary systems which can use each available resource in each secondary system cluster according to the interference of the secondary system cluster to the primary system. Further, the optimization unit 2213 can re-adjust the number of the available resources in the secondary system cluster according to the maximum number when the geographic distribution and the number of the secondary systems over each available resource are uniform. If the number of the secondary systems in the secondary system cluster exceeds the maximum value of the number of secondary systems in case of a certain given number K of frequency bands, it is possible to instruct the secondary systems in the cluster to add a new available frequency band and to perform a dynamic selection for frequency bands. If the number of frequency bands reaches the maximum value, this means that the increasing of the number of secondary systems in the cluster will lead to the decrease of the performance. When the number of secondary systems in the secondary system cluster is less than the maximum value of the number of the secondary systems which is less than the current value K, the number of frequency bands is decreased.

According to some embodiments of the disclosure, there is also provided a frequency spectrum utilizing enabler configured to manage the frequency spectrums of the secondary systems. The frequency spectrum utilizing enabler acquires the information about available frequency spectrums for the secondary systems controlled by the frequency spectrum utilizing enabler, by accessing a frequency spectrum manager. The frequency spectrum utilizing enabler makes corresponding operations on the secondary systems according to the control from the frequency spectrum manager, for example, reporting the frequency spectrum usage situation of the secondary systems, changing the frequency spectrum usage, and adjusting the number of available frequency spectrums of the secondary system. The frequency spectrum utilizing enabler can be provided at an access point (AP) or a base station in the secondary systems, as a part of the access point or the base station. Alternatively, the frequency spectrum utilizing enabler may be provided at a secondary system frequency spectrum manager, as a part of the secondary system frequency spectrum manager.

Figure 24:
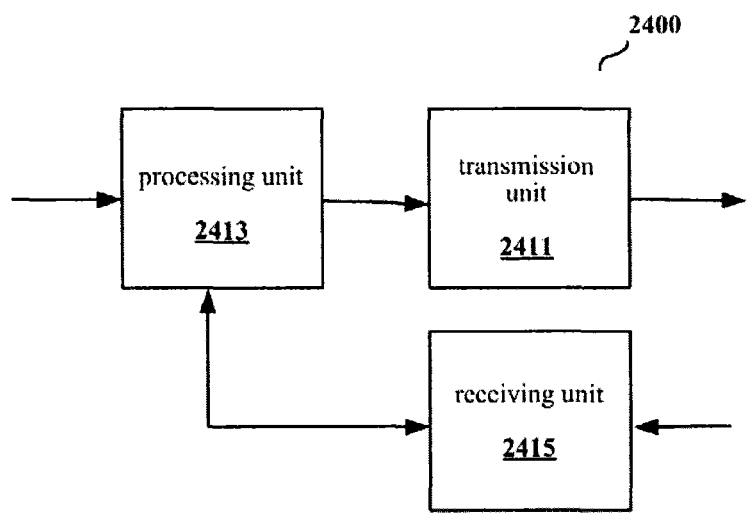
FIG. 24 is a schematic block diagram of a frequency spectrum utilizing enabler according to an embodiment of the disclosure.

FIG. 24 is a schematic block diagram of a frequency spectrum utilizing enabler according to an embodiment of the disclosure. As shown in FIG. 24, the frequency spectrum utilization enabler 2400 includes a transmission unit 2411, a processing unit 2413 and a receiving unit 2415. The transmission unit 2411 is configured to establish a communication connection with the frequency spectrum manager and secondary users in the secondary systems controlled by the frequency spectrum utilizing enabler. The processing unit 2413 collects the system status information of the secondary systems, and controls the transmission unit to transmit the system status information to the frequency spectrum manager, so that the frequency spectrum manager uses the system status information to cluster the plurality of secondary systems into secondary system clusters having a uniform geographic distribution density, so as to configure the available resources for the secondary systems in a unit of cluster. The system status information includes information about whether the secondary system is in an activated state. The system status information may also include other information about the running state of the secondary systems, such as the location or resource utilization situation of the secondary systems, which is not enumerated here. The receiving unit 2415 also establishes a communication connection with the frequency spectrum manager and the respective secondary users, and can receive information about available resources which is configured for the secondary systems by the frequency spectrum manager. The processing unit 2413 can control the transmission unit 2411 to notify the secondary users in the secondary systems of the information about the available resources.

In one specific embodiment, the processing unit 2413 can also control the transmission unit 2411 to transmit information about the usage of the available resources by the secondary systems to the frequency spectrum manager, so that the frequency spectrum manager determines whether the distribution of the secondary systems in the secondary system cluster is uniform and whether the usage of frequency spectrum resources is uniform.

In another specific embodiment, the receiving apparatus 2415 can also receive the update information of the available resources, and the processing unit 2413 may also change the resource usage mode of the secondary system according to the update information, such as increasing or decreasing the number of selectable frequency bands.

According to some embodiments of the disclosure, there is also provided a wireless communication system which includes a primary system and a plurality of secondary systems and also includes the wireless transmission resource manager according to the embodiments or examples descried above.

The above embodiments of the disclosure may be applied to various scenarios, for example, the embodiments can be applied to the dynamical access control. In this case, the secondary system frequency spectrum manager establishes the secondary system cluster managed by the secondary system frequency spectrum manager according to communication system service requirements, such as according to the number of wireless uses and service requirements in a certain region in a certain time period. The cluster can contain therein a certain number of secondary systems, including local area networks, end to end communications and so on. The secondary system frequency spectrum manager calculates the maximum number of the secondary systems in the cluster when a different number of frequency bands are used, then dynamically detects the number of secondary systems in the cluster, and manages the frequency spectrum usage of the secondary systems by the secondary system frequency spectrum utilizing enabler, so as to reach the maximization of the frequency spectrum utilization, thus achieving the access management of the secondary system frequency spectrums. In another example, the embodiments disclosed above and below can also be applied for frequency spectrum division. In this case, when there are a plurality of secondary systems which need to utilize the frequency spectrums of the primary system, the secondary system frequency spectrum manager directly calculate, according to the number of secondary systems and the region distribution thereof, the number of frequency bands that this number of secondary systems should use, thus maximizing the frequency spectrum utilization. Using the above or below embodiments, the number of the secondary systems can be predicted according to time. For example, at different times and in different regions, the wireless traffic will change greatly. For example, in the daytime, traffic in the urban financial center increases, and in the evening, traffic in a residential area increases. Thus, the density of the secondary systems and the number of activated secondary systems at different time periods and in different regions can be calculated according to the traffic statistical model. The usage of frequency bands at different time period and in different region can be optimized in advance. When the secondary system inquires the available spectrum resources, the secondary system frequency spectrum manager can send the frequency band control information to the secondary system directly according to the current time and the location of the secondary system. Such long-term pre-planning based on service models reduces the real-time spectrum management and reduces the required system burden.

Further, it should be understood that the resource management method and apparatus in the embodiments or examples described above are exemplary. In actual applications, the resource management method and apparatus may also include steps, elements or components omitted in the above description.

According to some embodiments of the disclosure, there is also provided a radio communication system including the resource management apparatus described above. The resource management apparatus may be provided in the frequency spectrum manager or a secondary base station and can be provided as a part of the secondary base station or the frequency spectrum manager.

It should be understood that, the embodiments and examples described above are exemplary but not exhaustive, and the disclosure should not be construed as being limited to any specific embodiment or example. Further, in the embodiments and examples described above, digital signatures are used to indicate steps of the method or modules of the apparatus. Those skilled in the art should understand that these digital signatures are merely for distinguishing these steps or modules literally, and are not intended to represent their order or any other definition.

As one example, respective steps of the method described above and respective modules and/or units of the apparatus described above can be implemented as software, firmware, hardware or a combination thereof. As one example, in case of being implemented as software or firmware, programs composing the software for implementing the method described above can be installed to a computer (e.g. a general purpose computer 2300 shown in FIG. 23) having a dedicated hardware configuration from a storage medium or a network. When being mounted with various programs, the computer can implement various functions and the like.

Figure 23:
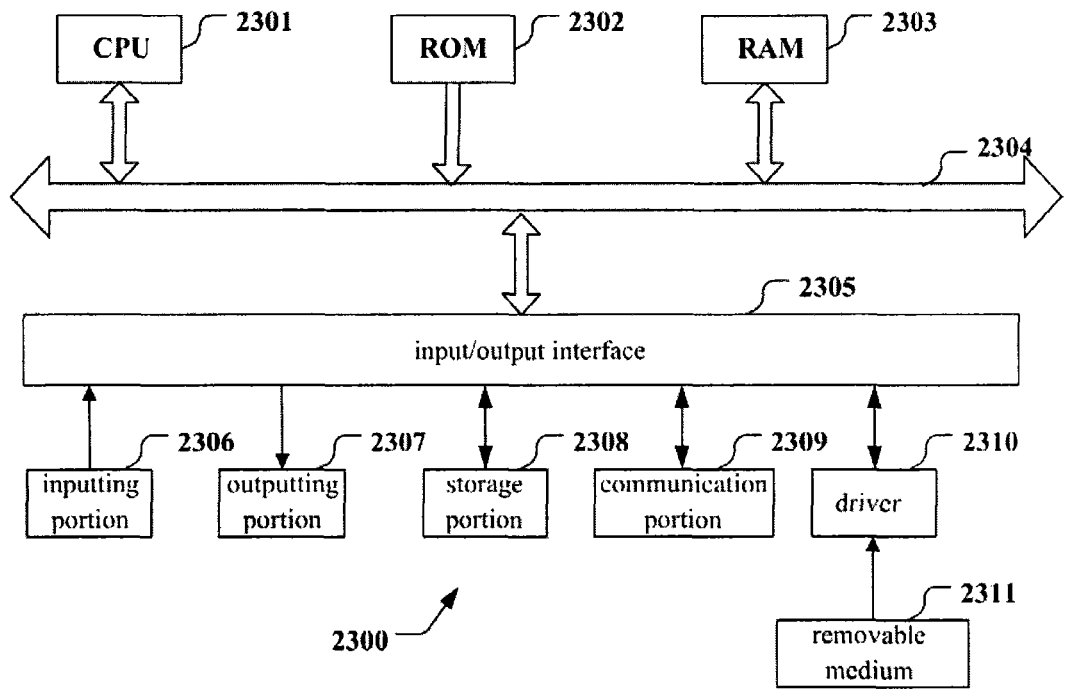
FIG. 23 is a schematic block diagram of the structure of a computer apparatus which can implement embodiments according to the disclosure.

In FIG. 23, the Center Processing Unit (CPU) 2301 performs various processes according to the program stored in the Read Only Memory (ROM) 2302 or the program loaded onto the Random Access Memory (RAM) 2303 from the storage portion 2308. In RAM 2303, the data required by the CPU 2301 to perform various processes and the like is also stored as required. The CPU 2301, the ROM 2302 and the RAM 2303 are connected to each other via a bus 2304. The input/output interface 2305 is also connected to the bus 2304.

The following components are connected to the input/output interface 2305: an inputting portion 2306 (including a keyboard, a mouse and the like), an outputting portion 2307 (including a display, such as a Cathode Ray Tube (CRT), and Liquid Crystal Display (LCD), a speaker and the like), a storage portion 2308 (including a hard disk and the like), and a communication portion 2309 (including a network interface card, such as a LAN card, a modem and the like). The communication portion 2309 performs the communication process via a network such as Internet. The driver 2310 may also be connected to the input/output interface 2305 as required. A removable medium 2311, such as a magnetic disk, an optical disk, magnetic-optical disk, and semi-conductor storage can be mounted on the driver 2310 as required, so that the computer programs that are read out from there can be loaded into the storage portion 2308 as required.

In the case that the above series of processes are implemented using software, the programs composing the software can be installed from a network such as Internet or a storage medium such as a removable medium 2311.

It should be understood by those skilled in the art that the storage medium is not limited to the removable medium 2311 as shown in FIG. 23 in which the programs are stored and which is distributed separately from the device for providing the user with the program. The example of the removable medium 2311 includes a magnetic disk (including a soft disk (registered trademark)), an optical disk (including the Compact Disk Read Only Memory (CD-ROM) and the Digital Video Disk (DVD)), a magnetic-optical disk (including the Mini-Disk (MD) (registered trademark)) and a semi-conductor memory. Alternatively, the storage medium may be the hard disk included in the ROM 2302 and the storage portion 2308, and the like in which the programs are stored, and can be distributed to the user together with the device in which it is provided.

It is further provided in the disclosure a program product in which machine-readable instruction codes are stored. The machine-readable instruction codes are read and executed by the machine, for implementing the method according to the embodiments of the disclosure described above.

Accordingly, the storage medium for carrying the program product in which machine-readable instruction codes are stored is also included in the disclosure. The storage medium includes but not limited to a software disk, an optical disk, a magnetic-optical disk, a storage card, a storage stick and the like.

In the description of the specific embodiments of the invention described above, features described and/or shown for one embodiment can be used in one or more other embodiments in a same or similar manner, or can be combined with features of other embodiments, or replace features in other embodiments.

It is to be highlighted that the item "including/comprising" when using herein refers to the existence of a feature, element, step or component, but not exclusive of the existence or addition of one or more other features, elements, steps or components.

Moreover, the method of the disclosure is not limited to be performed sequentially in the temporal order described in the specification, and can also be performed in parallel or separately. Thus, the performing order of the method described in the specification does not limit the technical scope of the disclosure.

Provided below are exemplary configurations of the embodiments disclosed above.

According to one exemplary embodiment, the disclosure is directed to a system comprising: circuitry configured to identify a number of secondary systems located in a first geographical area; identify a primary resource available to be assigned to the secondary systems, the primary resource being a resource to which a primary system has a priority usage right; determine whether the number of secondary systems located in the first geographical area exceeds a predetermined threshold value; and limit a number of secondary systems to which the primary resource is assigned when it is determined that the number of secondary systems located in the first geographical area exceeds the predetermined threshold value.

According to the system above, the circuitry is configured to identify a distribution of the secondary systems in a second geographical area having a size greater than and including the first geographical area, based on a number of the secondary systems included in the second geographical area.

According to the system above, the circuitry is configured to identify a plurality of clusters of secondary systems based on the identified distribution of the secondary systems in the second geographical area, wherein the plurality of clusters include a first cluster including the first number of the secondary systems located in the first geographical area and a second cluster including a second number of the secondary systems located in a third geographical area that is different from the first geographical area and included in the second geographical area.

According to the system above, the circuitry is configured to: determine an amount of interference to the second cluster in the case that the primary resource is assigned to the first cluster; assign the primary resource to the first cluster when the determined amount of interference to the second cluster is less than a predetermined threshold value; and limit an amount of the primary resource assigned to the first cluster when the determined amount of interference to the secondary cluster is greater than the predetermined threshold value.

According to the system above, the circuitry is configured to identify the first and second clusters such that a geographic distribution of secondary systems included in each of the first and second clusters is substantially uniform.

According to the system above, the circuitry is configured to determine a primary resource available to be assigned to the secondary systems included in the first and second clusters.

According to the system above, the circuitry is configured to: determine an amount of interference to the primary system in the case that the primary resource is assigned to the secondary systems; assign the primary resource to the secondary systems when the determined amount of interference to the primary system is less than a predetermined threshold value; and limit an amount of the primary resource assigned to the secondary systems when the determined amount of interference to the primary system is greater than the predetermined threshold value.

According to the system above, the primary resource available to be assigned to the secondary systems corresponds to a frequency band; and the circuitry is configured to limit the number of secondary systems to which the frequency band is assigned when it is determined that the number of secondary systems exceeds the predetermined threshold value.

According to the system above, the circuitry is configured to: identify that the number of secondary systems falls below the predetermined threshold; and assign the frequency band to the secondary systems when the number of secondary systems falls below the predetermined threshold.

According to the system above, the primary resource available to be assigned to the secondary system corresponds to at least a first frequency band and a second frequency band; and the circuitry is configured to assign only one of the first frequency band and the second frequency band to the secondary systems when it is determined that the number of secondary systems is less than a second predetermined threshold value.

According to the system above, the primary resource available to be assigned to the secondary system corresponds to at least a first frequency band and a second frequency band; and the circuitry is configured to assign both of the first and second frequency bands to the secondary systems when it is determined that the number of secondary systems is greater than a second predetermined threshold value.

According to the system above, the primary resource available to be assigned to the secondary system corresponds to at least a first frequency band and a second frequency band; and the circuitry is configured to optimize assignment of the first frequency band and the second frequency band to each of the plurality of secondary systems.

According to the system above, the circuitry is configured to optimize assignment of the first frequency band and the second frequency band to each of the plurality of systems based on a determined level of interference between each of the secondary systems.

According to the system above, the circuitry is configured to optimize assignment of the first frequency band and the second frequency band to each of the plurality of systems such that a number of secondary systems to which the first frequency band is assigned and a number of secondary systems to which the second frequency band is assigned is substantially similar.

According to the system above, the circuitry is configured to determine an amount of interference caused between the secondary systems in the case that the primary resource available to be assigned to the secondary systems is assigned to the secondary systems.

According to the system above, the circuitry is configured to assign the primary resource available to be assigned to the secondary systems when the determined amount of interference caused between the secondary systems is less than a predetermined threshold value.

According to the system above, the circuitry is configured to limit the amount of the primary resource available to be assigned to the secondary systems when the determined amount of interference caused between the secondary systems is greater than a predetermined threshold value.

According to the system above, the circuitry is configured to identify additional primary resources to be assigned to the secondary systems when it is determined that the number of secondary systems located in the first geographical area exceeds the predetermined threshold value.

According to another exemplary embodiment, the disclosure is directed to a non-transitory computer-readable medium including computer-readable instructions, which when executed by a system, cause the system to: identify a number of secondary systems located in a first geographical area; identify a primary resource available to be assigned to the secondary systems, the primary resource being a resource to which a primary system has a priority usage right; determine whether the number of secondary systems located in the first geographical area exceeds a predetermined threshold value; and limit a number of secondary systems to which the primary resource is assigned when it is determined that the number of secondary systems located in the first geographical area exceeds the predetermined threshold value.

According to another exemplary embodiment, the disclosure is directed to a system comprising: circuitry configured to identify a plurality of secondary systems located in a predetermined geographical area; determine a primary resource available to be assigned to the plurality of secondary systems; determine whether assignment of the primary resource to all of the plurality of secondary systems in the predetermined geographical area would create an unacceptable interference level; and limiting a number of secondary systems to which the primary resource is assigned when it is determined that assignment of the primary resource to all of the plurality of secondary systems in the predetermined geographical area would create an unacceptable interference level.

According to another exemplary embodiment, the disclosure is directed to an apparatus in a wireless communication system for a wireless communication scenario comprising a primary system and a plurality of secondary systems, comprising: a distribution estimation unit configured to estimate a geographic distribution density of the plurality of secondary systems; a clustering unit configured to cluster the plurality of secondary systems into one or more clusters according to the geographic distribution density, wherein the geographic distribution of the secondary systems in each cluster is uniform; and a resource configuration unit configured to determine, in a unit of cluster, information about available resources which can be used by the secondary systems in transmission resources of the primary system.

The apparatus above, further comprising: a channel model obtaining unit configured to obtain channel models between respective secondary systems, wherein the clustering unit is further configured to cluster the plurality of secondary systems according to the channel models between the respective secondary systems and the geographic distribution density, the channel models between respective secondary systems in each cluster being substantially consistent with each other.

The apparatus above, further comprising: a channel model obtaining unit configured to obtain a channel model between each secondary system and the primary system, wherein the clustering unit is further configured to cluster the plurality of secondary systems according to the channel model between each secondary system and the primary system and the geographic distribution density, the channel models between respective secondary systems in each cluster and the primary system being substantially consistent with each other.

The apparatus above, further comprising: an interference estimation unit configured to estimate the interference of each secondary system cluster to the primary system, wherein the resource configuration unit is further configured to determine, in a unit of cluster, information about available resources which can be used by each secondary system cluster in the transmission resources of the primary system according to the estimated interference of each secondary system cluster to the primary system.

According to the apparatus above, the resource configuration unit is further configured to: obtain, according to a maximum interference threshold of the primary system, information about the available resource which can be used by each secondary system cluster in the case that the secondary system cluster comprises a different number of activated secondary systems.

According to the apparatus above, the information about the available resource which can be used by each secondary system cluster in case that the secondary system cluster comprises a different number of activated secondary systems comprises information about a relationship between the number of activated secondary systems in the secondary system cluster and an available maximum transmission power, available transmission resources, the number of the available transmission resources and available time periods of each secondary system in the secondary system cluster.

According to the apparatus above, the interference estimation unit is configured to: obtain interference of a cluster to the primary system by estimating interference of each secondary system in the cluster to the coverage region edge of the primary system.

The apparatus above, further comprising: an intra-cluster interference estimation unit configured to estimate mutual interference between respective secondary systems in each secondary system cluster; and wherein the resource configuration unit is further configured to optimize available resources which can be used by the secondary systems according to the estimated mutual interference between respective secondary systems in each secondary system cluster.

The apparatus above, further comprising: an inter-cluster interference estimation unit configured to estimate mutual interference between respective secondary system clusters; and wherein the resource configuration unit is further configured to optimize available resources which can be used by the secondary systems according to the estimated mutual interference between respective secondary system clusters.

According to the apparatus above, the resource configuration unit is further configured to optimize available resources which can be used by the secondary systems by: obtaining, according to the estimated mutual interference between respective secondary systems in each secondary system cluster and/or the estimated mutual interference between respective secondary system clusters, a maximum value of the number of activated secondary systems in each secondary cluster in the case that available resources of the secondary system cluster and the number thereof are fixed.

The apparatus above, further comprising: an optimization unit configured to decide whether the number of secondary systems over respective available resources in each secondary system cluster is uniform, and if not, to re-adjust the secondary systems over related available resource.

According to the apparatus above, the optimization unit is further configured to decide whether the geographic distribution of secondary systems over each available resource is uniform, and if not, to re-adjust the secondary systems over related available resource.

According to the apparatus above, the optimization unit is further configured to determine a maximum number of secondary systems which can use each available resource in each secondary system cluster according to interference of the secondary system cluster to the primary system; and to re-adjust the number of the available resources in the secondary system cluster according to the maximum number when the geographic distribution and the number of secondary systems over each available resource are uniform.

According to the apparatus above, the distribution estimation unit is configured to estimate the number of secondary systems in an activated state per unit area of a region as the geographic distribution density of the secondary systems in the region.

According to another exemplary embodiment, the disclosure is directed to a method in a wireless communication system for a wireless communication scenario comprising a primary system and a plurality of secondary systems, comprising: estimating a geographic distribution density of the plurality of secondary systems; clustering the plurality of secondary systems into one or more clusters according to the geographic distribution density, wherein the geographic distribution of the secondary systems in each cluster is uniform; and determining, in a unit of cluster, information about available resources which can be used by the secondary systems in transmission resources of the primary system.

The method above, further comprising: obtaining channel models between respective secondary systems, wherein the clustering the plurality of secondary systems into one or more clusters comprises clustering the plurality of secondary systems according to the channel models between the respective secondary systems and the geographic distribution density, the channel models between respective secondary systems in each cluster being substantially consistent with each other.

The method above, further comprising: obtaining a channel model between each secondary systems and the primary system, wherein the clustering the plurality of secondary systems into one or more clusters comprises clustering the plurality of secondary systems according to the channel model between each secondary system and the primary system and the geographic distribution density, the channel models between respective secondary systems in each cluster and the primary system being substantially consistent with each other.

The method above, wherein, the determining, in a unit of cluster, the information about available resources which can be used by the secondary systems in transmission resources of the primary system comprises: estimating the interference of each secondary system cluster to the primary system; and determining, in a unit of cluster, information about the available resource which can be used by each secondary system cluster in the transmission resources of the primary system, according to the estimated interference of each secondary system cluster to the primary system.

The method above, wherein, the determining the information about the available resource which can be used by each secondary system comprises: obtaining, according to a maximum interference threshold of the primary system, information about the available resource which can be used by each secondary system cluster in the case that the secondary system cluster comprises a different number of activated secondary systems.

The method above, wherein the information about the available resource which can be used by each secondary system cluster in the case that the secondary system cluster comprises a different number of activated secondary systems comprises information about a relationship between the number of activated secondary systems in the secondary system cluster and an available maximum transmission power, available transmission resources, the number of the available transmission resources and available time periods of each secondary system in the secondary system cluster.

The method above, wherein the estimating the interference of each secondary system cluster to the primary system comprises: obtaining interference of a cluster to the primary system by estimating interference of each secondary system in the cluster to the coverage region edge of the primary system.

The method above, further comprising: estimating mutual interference between respective secondary systems in each secondary system cluster; and optimizing available resources which can be used by the secondary systems according to the estimated mutual interference between respective secondary systems in each secondary system cluster.

The method above, further comprising: estimating mutual interference between respective secondary system clusters; and optimizing available resources which can be used by the secondary systems according to the estimated mutual interference between respective secondary system clusters.

The method above, wherein the optimizing available resources which can be used by the secondary systems comprises: obtaining, according to the estimated mutual interference between respective secondary systems in each secondary system cluster and/or the estimated mutual interference between respective secondary system clusters, a maximum value of the number of activated secondary systems in each secondary cluster in the case that available resources of the secondary system cluster and the number thereof are fixed.

The method above, further comprising: deciding whether the number of secondary systems over respective available resources in each secondary system cluster is uniform, and if not, re-adjusting the secondary systems over related available resource.

The method above, further comprising: deciding whether the geographic distribution of secondary systems over each available resource is uniform, and if not, re-adjusting the secondary systems over related available resource.

The method above, further comprising: determining a maximum number of secondary systems which can use each available resource in each secondary system cluster according to interference of the secondary system cluster to the primary system; and re-adjusting the number of the available resources in the secondary system cluster according to the maximum number when the geographic distribution and the number of secondary systems over each available resource are uniform.

The method above, wherein the estimating the geographic distribution of the plurality of secondary systems comprises: estimating the number of secondary systems in an activated state per unit area of a region as the geographic distribution density of the secondary systems in the region.

According to another exemplary embodiment, the disclosure is directed to a frequency spectrum utilizing enabler for a wireless communication scenario comprising a primary system and a plurality of secondary systems, comprising: a transmission unit; a processing unit configured to collect system status information of the secondary systems controlled by the frequency spectrum utilizing enabler and control the transmission unit to transmit the system status information to a frequency spectrum manager, so that the frequency spectrum manager utilizes the system status information to cluster the plurality of secondary systems state per unit area of a region as the geographic distribution density of the secondary systems in the region.

According to another exemplary embodiment, the disclosure is directed to a frequency spectrum utilizing enabler for a wireless communication scenario comprising a primary system and a plurality of secondary systems, comprising: a transmission unit; a processing unit configured to collect system status information of the secondary systems controlled by the frequency spectrum utilizing enabler and control the transmission unit to transmit the system status information to a frequency spectrum manager, so that the frequency spectrum manager utilizes the system status information to cluster the plurality of secondary systems into secondary system clusters with uniform geographic distribution densities so as to configure available resources for the secondary systems in a unit of cluster; and a receiving unit configured to receive information about corresponding available resources configured by the frequency spectrum manager, wherein the processing unit controls the transmission unit to notify secondary users in the secondary systems of the information about the available resources.

The frequency spectrum utilizing enabler above, wherein the processing unit is further configured to control the transmission unit to transmit information about usage of the available resources by the secondary systems to the frequency spectrum manager.

The frequency spectrum utilizing enabler above, wherein the receiving unit is further configured to receive update information of the frequency spectrum manager with respect to the available resources, and the processing unit is further configured to change the manner of resource usage of the secondary systems according to the update information.

Although the present disclosure has been disclosed above by describing the embodiments of the disclosure, it should be understood that various modifications, improvements or equivalents can be made to the disclosure by those skilled in the art within the spirit and scope of the appended claims. These modifications, improvements or equivalents should also be considered as within the scope of protection of the disclosure.

The invention claimed is:

1. A system comprising: circuitry configured to:
   identify a number of secondary systems located in a first geographical area;
   identify a primary resource available to be assigned to the secondary systems, the primary resource being a resource to which a primary system has a priority usage right;
   determine whether the number of secondary systems located in the first geographical area exceeds a required threshold value that is a maximum interference threshold allowable by the primary system;
   limit a number of secondary systems to which a frequency band is assigned when it is determined that the number of secondary systems located in the first geographical area exceeds the required threshold value, wherein the primary resource available to be assigned to the secondary systems corresponds to a frequency band;
   identify that the number of secondary systems falls below the required threshold value; and
   assign the frequency band to the secondary systems when the number of secondary systems falls below the required threshold value.

2. The system of claim 1, wherein the circuitry is configured to identify a distribution of the secondary systems in a second geographical area having a size greater than and including the first geographical area, based on a number of the secondary systems included in the second geographical area.

3. The system of claim 2, wherein the circuitry is configured to identify a plurality of clusters of secondary systems based on the identified distribution of the secondary systems in the second geographical area, wherein the plurality of clusters include a first cluster including a first number of the secondary systems located in the first geographical area and a second cluster including a second number of the secondary systems located in a third geographical area that is different from the first geographical area and included in the second geographical area.

4. The system of claim 3, wherein the circuitry is configured to: determine an amount of interference to the second cluster in a case that the primary resource is assigned to the first cluster; assign the primary resource to the first cluster when the determined amount of interference to the second cluster is less than a predetermined threshold value; and limit an amount of the primary resource assigned to the first cluster when the determined amount of interference to the secondary cluster is greater than the predetermined threshold value.

5. The system of claim 3, wherein the circuitry is configured to identify the first and second clusters such that a geographic distribution of secondary systems included in each of the first and second clusters is substantially uniform.

6. The system of claim 3, wherein the circuitry is configured to determine a primary resource available to be assigned to the secondary systems included in the first and second clusters.

7. The system of claim 1, wherein the circuitry is configured to: determine an amount of interference to the primary system in a case that the primary resource is assigned to the secondary systems; assign the primary resource to the secondary systems when the determined amount of interference to the primary system is less than a predetermined threshold value; and limit an amount of the primary resource assigned to the secondary systems when the determined amount of interference to the primary system is greater than the predetermined threshold value.

8. The system of claim 1, wherein the primary resource available to be assigned to the secondary system corresponds to at least a first frequency band and a second frequency band; and the circuitry is configured to assign only one of the first frequency band and the second frequency band to the secondary systems when it is determined that the number of secondary systems is less than another required threshold value.

9. The system of claim 1, wherein the primary resource available to be assigned to the secondary system corresponds to at least a first frequency band and a second frequency band; and the circuitry is configured to assign both of the first and second frequency bands to the secondary systems when it is determined that the number of secondary systems is greater than another required threshold value.

10. The system of claim 1, wherein the primary resource available to be assigned to the secondary system corresponds to at least a first frequency band and a second frequency band; and the circuitry is configured to optimize assignment of the first frequency band and the second frequency band to each of the secondary systems.

11. The system of claim 10, wherein the circuitry is configured to optimize assignment of the first frequency band and the second frequency band to each of the secondary systems based on a determined level of interference between each of the secondary systems.

12. The system of claim 10, wherein the circuitry is configured to optimize assignment of the first frequency band and the second frequency band to each of the secondary systems such that a first number of secondary systems to which the first frequency band is assigned and a second number of secondary systems to which the second frequency band is assigned is equal.

13. The system of claim 1, wherein the circuitry is configured to determine an amount of interference caused between the secondary systems in a case that the primary resource available to be assigned to the secondary systems is assigned to the secondary systems.

14. The system of claim 13, wherein the circuitry is configured to assign the primary resource available to be assigned to the secondary systems when the determined amount of interference caused between the secondary systems is less than a predetermined threshold value.

15. The system of claim 13, wherein the circuitry is configured to limit the amount of the primary resource available to be assigned to the secondary systems when the determined amount of interference caused between the secondary systems is greater than a predetermined threshold value.

16. The system of claim 1, wherein the circuitry is configured to identify additional primary resources to be assigned to the secondary systems when it is determined that the number of secondary systems located in the first geographical area exceeds the required threshold value.

17. A non-transitory computer-readable medium including computer-readable instructions, which when executed by a system, cause the system to:
identify a number of secondary systems located in a first geographical area;
identify a primary resource available to be assigned to the secondary systems, the primary resource being a resource to which a primary system has a priority usage right;
determine whether the number of secondary systems located in the first geographical area exceeds a required threshold value that is a maximum interference threshold allowable by the primary system;
limit a number of secondary systems to which a frequency band is assigned when it is determined that the number of secondary systems located in the first geographical area exceeds the required threshold value, wherein the primary resource available to be assigned to the secondary systems corresponds to the frequency band;
identify that the number of secondary systems falls below the required threshold value; and
assign the frequency band to the secondary systems when the number of secondary systems falls below the required threshold value.

18. A system comprising: circuitry configured to:
identify a plurality of secondary systems located in a predetermined geographical area; determine a primary resource available to be assigned to the plurality of secondary systems, the primary resource being a resource to which a primary system has a priority usage right;
determine whether assignment of the primary resource to all of the plurality of secondary systems in the predetermined geographical area would exceed a required threshold value that is a maximum interference threshold allowable by the primary system;
limit a number of secondary systems to which a frequency band is assigned when it is determined that assignment of the primary resource to all of the plurality of secondary systems in the predetermined geographical area would exceed the required threshold value, wherein the primary resource available to be assigned to the plurality of secondary systems corresponds to the frequency band;
identify that the number of secondary systems falls below the required threshold value; and
assign the frequency band to the plurality of secondary systems when the number of secondary systems falls below the required threshold value.

* * * * *